US005580265A

United States Patent [19]
Koblitz et al.

[11] Patent Number: 5,580,265
[45] Date of Patent: *Dec. 3, 1996

[54] SEALANT COMPOSITIONS AND SEALED ELECTRICAL CONNECTORS

[75] Inventors: Francis F. Koblitz, York; Thomas J. Lynch, Mechanicsburg; Ricky C. Mellinger, Seven Valleys, all of Pa.

[73] Assignee: The Whitaker Corporation, Wilmington, Del.

[ * ] Notice: The term of this patent shall not extend beyond the expiration date of Pat. No. 5,360,350.

[21] Appl. No.: 297,574

[22] Filed: Aug. 29, 1994

Related U.S. Application Data

[63] Continuation of Ser. No. 878,807, May 5, 1992, Pat. No. 5,360,350, which is a continuation-in-part of Ser. No. 749,373, Aug. 23, 1991, Pat. No. 5,354,210.

[51] Int. Cl.$^6$ .............................. H01R 13/52; H01B 3/44
[52] U.S. Cl. .......................... 439/276; 252/575; 252/578; 252/579; 439/936; 523/173; 524/476; 524/505; 524/507; 524/528; 525/89
[58] Field of Search ..................... 252/575, 578, 252/579; 439/276, 936; 524/476, 505, 507, 528; 523/173; 525/89

[56] References Cited

U.S. PATENT DOCUMENTS

| | | | |
|---|---|---|---|
| Re. 33,354 | 9/1990 | Downey et al. | 428/375 |
| 2,906,810 | 9/1959 | D'Ascoli et al. | 174/87 |
| 3,020,260 | 8/1962 | Nelson | 260/46.5 |
| 3,239,478 | 6/1963 | Harlan, Jr. | 260/27 |
| 3,265,765 | 8/1966 | Holden et al. | 260/876 |
| 3,410,950 | 11/1968 | Freudenberg | 174/84 |
| 3,485,787 | 12/1969 | Haefele et al. | 260/33.6 |
| 3,522,576 | 4/1968 | Cairns | 339/96 |
| 3,536,626 | 10/1970 | D'Ascoli et al. | 252/64 |
| 3,539,708 | 3/1968 | D'Ascoli et al. | 174/87 |
| 3,676,387 | 7/1972 | Lindlof | 260/28.5 B |
| 3,784,952 | 1/1974 | Murray | 339/12 V |
| 3,827,999 | 8/1974 | Crossland | 260/33.6 AQ |
| 3,879,575 | 4/1975 | Dobbin et al. | 174/92 |
| 3,897,129 | 7/1975 | Farrar, Jr. | 339/116 |
| 4,041,103 | 8/1977 | Davison et al. | 260/857 D |
| 4,087,585 | 5/1978 | Schulz | 428/429 |
| 4,101,605 | 7/1978 | Gergen et al. | 268/873 |
| 4,102,716 | 7/1978 | Groves et al. | 156/48 |
| 4,171,998 | 10/1979 | Brauer et al. | 156/48 |
| 4,369,284 | 1/1983 | Chen | 524/476 |
| 4,375,521 | 3/1983 | Arnold | 523/173 |
| 4,425,017 | 1/1984 | Chan | 339/96 |
| 4,451,696 | 5/1984 | Beinhaur | 174/92 |
| 4,514,588 | 4/1995 | Beever et al. | 524/505 |
| 4,600,261 | 7/1986 | Debbaut | 339/116 |
| 4,634,207 | 1/1987 | Debbaut | 339/116 |
| 4,701,016 | 10/1987 | Gartside, III et al. | 350/96.23 |
| 4,705,340 | 11/1987 | Loose | 439/395 |
| 4,714,801 | 12/1987 | Koblitz et al. | 178/88 |
| 4,716,183 | 12/1987 | Gamarra et al. | 524/490 |
| 4,798,853 | 1/1989 | Handlin, Jr. | 523/173 |
| 4,833,193 | 5/1989 | Sievering | 524/486 |
| 4,864,725 | 9/1989 | Debbaut | 29/871 |
| 4,865,905 | 9/1989 | Uken | 428/220 |
| 4,883,431 | 11/1989 | Uken et al. | 439/521 |
| 4,909,756 | 3/1990 | Jervis | 439/521 |
| 4,942,270 | 7/1990 | Gamarra | 174/93 |
| 4,998,894 | 3/1991 | Gronvall | 439/521 |
| 5,004,869 | 4/1991 | Koblitz et al. | 174/84 |
| 5,006,077 | 4/1991 | Loose et al. | 439/409 |
| 5,360,350 | 11/1994 | Koblitz et al. | 524/505 |

FOREIGN PATENT DOCUMENTS

| | | |
|---|---|---|
| 0058022 | 8/1982 | European Pat. Off. . |
| 0371641 | 6/1990 | European Pat. Off. . |
| 2195642 | 4/1988 | United Kingdom . |
| 9105014 | 4/1991 | WIPO . |

OTHER PUBLICATIONS

K. B. Wagener and L. P. Engle, Thermally Reversible Polymer Linkages III. Covalently Crosslinked Poly (Aslactone), Polymer Preprints, vol. 32, No. 1, Apr. 1991.

C. G. Varelas et al., Microdomain Composition in Two Phase Hydrogels, Polymer Preprints, vol. 32, No. 1, Apr. 1991.

Klein Rodrigues and Wayne L. Mattice, Simulation of Diblock Copolymers as Steric Stabilizers of Polymer Colloids, Polymer Preprints, vol. 32, No. 1, Apr. 1991.

Loon–Seng Tan and Fred E. Arnold, In–Situ Molecular Composites II: Synthesis and Characterization of Poly (Amic Dialkylamides) . . . Polymer Preprints, vol. 32, No. 1, Apr. 1991.

Painter et al., The Formulation of Molecular Composites through Hydrogen Bonding Interactions, Polymer Preprints, vol. 32, No. 1, Apr. 1991.

Quiet Comes to Florida, Outside Plant Magazine, copyright 1990, Practical Communications Inc.

(List continued on next page.)

*Primary Examiner*—Paul R. Michl
*Assistant Examiner*—Andrew E. C. Merriam

[57] ABSTRACT

Disclosed are sealant compositions having excellent slump and spew resistant, even at relatively high operating temperatures for electrical connectors. The sealants, which are flowable at such elevated temperatures, comprise two essential components: elastomeric thermoplastic polymer, preferably an organic polymer composite comprising diblock and triblock copolymers, and extender for the polymer. The extender may comprise a primary and a secondary extender, such as polybutene oil and mineral oil, respectively.

19 Claims, 8 Drawing Sheets

OTHER PUBLICATIONS

Bruce Malloy et al., Terminal Protection: New Technology Is Beginning to Gel, TE&M, Apr. 15, 1989.

Paul S. Russo, Reversible Polymeric Gels and Related Systems, 191st Meeting of the American Chemical Society, Apr. 13–18, 1986.

D. R. Hansen and Geoff Holden, Thermoplastic Elastomers, Modern Plastics Encyclopedia, 1985–86.

H. F. Giles, Jr., Alloys and Blends, Modern Plastics Encyclopedia, 1985–86.

AMP Instruction Sheet, IS 9616, released Apr. 27, 1990.

AMP Product Information Sheet, Catalog 90–923, issued 4–90.

AMP Instruction Sheet, IS 3206, released Mar. 9, 1990.

AMP Instruction Sheet 3217, released Dec. 20, 1989.

Generic Requires for Terminal Blocks, Bellcore Technical Advisory TA–TSY–000975, Issue 1, Sep. 1989.

Information About High Technology Silicone Materials, Dow Corning Information Sheet, copyright 1983.

Information About Silicone Elastomers, Dow Corning Information Sheet, copyright 1980.

Emerson & Cuming Technical Bulletins 15–2–3, publication date unknown.

Emerson & Cuming Technical Bulletin 15–2–3A/6–82, publication date unknown.

Information About Silicone Elastomers, Dow Corning Information Sheet, publication date unknown.

Information About Electrical/Electronic Materials, Dow Corning Information Sheet, publication date unknown.

SEALANT COMPOSITIONS AND SEALED ELECTRICAL CONNECTORS

This is a Continuation application of application Ser. No. 07/878,807, filed May 5, 1992, now U.S. Pat. No. 5,360,35 is a continuation-in-part of application Ser. No. 07/749,373, filed Aug. 23, 1991, now U.S. Pat. No. 5,354,210.

FIELD OF THE INVENTION

The present invention relates to novel polymer-containing compositions, electrical connectors which include said compositions as functional components, and methods of making such compositions. More particularly, this invention relates to compositions useful to seal and repair electrical connectors.

BACKGROUND OF THE INVENTION

Quality and durability are important factors in the design of systems for providing electrical connections, especially such systems utilized in the telecommunications and automotive industries. One criterion affecting the quality of such connections is the extent of effective electrical insulation surrounding the connection. Another important criterion is the maintenance of the connection in a moisture free environment. The invasion of water at the connection site is detrimental in several respects. For example, the "noise," "static" and "cross-talk" which frequently plague telecommunication systems are sometimes caused by signal leakage due to moisture at the connection site. The intrusion of water also has the obvious disadvantage of fostering corrosion and thus negatively impacting on the durability of the connection.

It is also desirable that electrical connections possess the ability to remain in a moisture free, non-corrosive environment when subjected to externally applied shock, vibration and temperature stresses.

While noise resistance, durability and moisture resistance in the face of environmental variations and other stresses is desirable in nearly all electrical connecting devices, there are also many commercial and military applications which require that electrical connections be repaired and/or modified in the field. It is highly desirable that such repair and/or modification be accomplished in the shortest period of time, in an economically efficient fashion and with a minimum of inconvenience to the field craftsperson or technician. In fact, such characteristics are also highly desirable from the standpoint of the initial manufacture of the electrical connecting device.

Nevertheless, many prior art devices and the sealant compositions used therein possess the disadvantage of being time consuming and inconvenient to manufacture and repair. For example, U.S. Pat. No. 3,897,129—Ferrar is directed to an apparatus for protecting electrical contacts by covering the contacts with a grease filled container. When repair or replacement of the connection requires reentry to the sealed contact, the container is removed from the contact. Disadvantageously, however, grease remains coated on the contact. This grease must be removed before the repair and/or modification can be effected, an undesirably messy and time-consuming task. Furthermore, the container must be refilled with grease prior to completion of the repair work.

It is also known to encapsulate electrical contacts within a container by means of a two-part liquid composition. When mixed together, the two components react slowly to produce a hard, relatively inflexible material. Before the ingredients set, the mixture is poured into the container where it cures in situ to form a hard, rigid plastic. U.S. Pat. Nos. 4,375,521—Arnold and 4,102,716—Graves disclose such devices. The procedure required by these devices, however, involves the obviously undesirable requirement that the composition be prepared under the conditions existing at the field location, thereby delaying and affecting the quality of the repair and/or modification. Moreover, the physical characteristics of the cured material are such that access to the actual contact is inhibited. Additionally, the chemical curing reaction is controlled by the ambient temperature, proceeding slowly or incompletely at low temperature and being inconveniently rapid at high temperatures.

Applicants have noted a failure of the prior art to provide devices and compositions which overcome the disadvantages described above while maintaining the stringent requirements of noise, moisture and temperature cycling resistance and environmental benignity and stability. Applicants have discovered novel polymer containing compositions which satisfy the long-demanded need for materials possessing this set of desirable characteristics.

Certain organic polymers are known to exhibit unique combinations of properties. Among these are block copolymers composed of polymer chains comprised of at least two different types of polymeric units, in which sequences (blocks) of one type of polymeric unit alternate with sequences of another type. If combined with the proper polymeric architecture, the resulting polymeric materials exhibit properties distinct and superior to those of each individual repeating component. For example, it is known that certain performance profiles such as heat resistance, thermoplasticity and elastomeric properties which are not attainable singly or in combination with homopolymers or even with random copolymers are attainable with such block copolymers or combinations thereof.

U.S. Pat. No. 3,265,765—Holden et al describes thermoplastic elastomers comprising block copolymers of the A-B-A configuration. Each A block is a glassy or resinous non-elastomeric thermoplastic polymer sequence and each B block is an elastomeric polymer block of a conjugated diene having a glass transition temperature considerably below the glass transition temperature of block A.

U.S. Pat. No. 4,942,270 to Gamarra is said to be directed to providing heat resistant gels without the necessity of using electron beam radiation. The compositions of Gamarra are poly(styrene-ethylene-butylene-styrene triblock copolymer-oil compositions. The compositions contain about 2 to about 30 parts by weight of a triblock copolymer and about 70 to about 98 parts by weight of a plasticizer. Polybutene oil and paraffinic/naphthenic oils or mixtures of these oils are disclosed as examples of plasticizer.

Preparation of the Gamarra compositions requires high temperature melt blending or high shear blending at lower temperatures. The need for high temperature/high shear blending of the Gamarra compositions is an obvious disadvantage in the preparation of these compounds. Another significant disadvantage of the Gamarra compositions is that such compositions are described as being nonmeltable. That is, these compositions will degrade, decompose or break down in some manner before they reach a temperature at which the composition will melt and become pourable. This is a disadvantage in the manufacture of sealed electrical connectors because of limited process flexibility. Furthermore, the repair or replacement of sealed electrical connectors containing such compositions would also be hampered by such characteristics.

Shell Chemical Company Technical Bulletin SC:759-85 provides technical information on KRATON G 1701, a diblock copolymer. This bulletin indicates that KRATON G 1701 is compatible with KRATON G 1652, a triblock copolymer, and that blends of the two polymers can be formulated to provide sealants with lower cohesive strength than KRATON G 1652 alone. The use of such materials in electrical connectors is not suggested nor is the means to provide permanently non-volatile formulations suggested.

The use of KRATON G Rubbers in clear sealants is presented in a July 1987 Shell Chemical Company Technical Bulletin entitled "KRATON G Rubbers in Clear Sealants." This report indicates that diblock copolymers such as KRATON G 1701x provide a means to tailor the adhesion and cohesive strength of a sealant composition. The diblock copolymer KRATON G 1701x is also said to provide unique thixotropic characteristics to sealant compositions. The sealants disclosed in this bulletin are intended to be used in sealing material such as glass, metal or wood from the effects of the environment. These clear sealants are said to adhere to a variety of substrates and may be painted if desired after the solvent components have evaporated. Means to provide 100% non-volatile compounds are not disclosed, such compounds being essential for sealing electrical connectors.

The use of KRATON Thermoplastic Rubbers in oil gels is presented in Shell Chemical Company Technical Bulletin SC:1102-89 of April 1989 entitled "KRATON Thermoplastic Rubbers in Oil Gels." This bulletin provides information on the physical properties of KRATON G 1651 and KRATON G 1701x. The bulletin indicates that the KRATON G rubber compounds may be used in a blend with polyethylene wax and processing oil to use as a waterproof sealant for telecommunications cable. The need for temperature resistance, insulation resistance and other qualities required for sealed electrical connectors are not discussed.

SUMMARY OF THE INVENTION

Applicants have found that the deficiencies of the prior art can be overcome by sealant compositions which provide an unusual and difficult to obtain combination of properties. In particular, applicants have discovered elastomeric compositions which are both slump and spew resistant while also being flowable over a moderately elevated temperature range. The term "flowable" is used to refer to the extrudability, injectability or pourability of the compositions of the present invention. The term "moderately elevated temperature range" is used herein to refer to the range of temperatures extending from about the melt or softening point of the compositions upward to about 200° C. It should be noted that the present compositions are preferably simultaneously slump and spew resistant and flowable through this moderately elevated temperature range. Applicants have found that such a combination of features is highly beneficial from the standpoint of both manufacturing techniques and operability. The ability of the present sealant compositions to resist slumping and spewing at the upper end of its operating temperature range has obvious advantages in connecting devices adapted for elevated temperature service, such as is frequently required in automotive applications. However, it is thoroughly unexpected that such a property is capable of coexisting in a sealant which also has the processing advantage of being flowable at such moderately elevated temperatures. Applicants have achieved this surprising result by providing compositions having a carefully selected, synergistic combination of components.

Because of the unique combination of properties described above, the compositions of the present invention are especially well suited to field repair of electrical connectors and connector housings. The resistance of the compositions to spewing and slumping means that the compositions remain in the connector even at the upper end of the operating temperature range. Surprisingly, however, and despite the excellent slump and spew resistance of the present compositions at moderately elevated temperatures, the present compositions are flowable at such temperatures. These properties advantageously permit, for example, the compositions to be injected by a syringe or similar apparatus into sealed connectors through the wire entry/exit holes of the connectors. The injectability of the present compositions eliminates the need to open a connector to add new material as required in many prior art sealant compositions.

The preferred compositions of the present invention also have an ability to bond, seal and insulate electrical contacts and connector housings, while simultaneously having a highly desirable balance of cohesive strength and adhesive strength. Electrical connectors containing such materials offer the possibility of being both effective and reusable.

Applicants have found that the adhesive strength of the preferred compositions provides a strong temperature and water-resistant seal while the cohesive strength thereof ensures that the composition will remain in the connector when terminated wires or test probes are removed. Furthermore, the substantial elastic memory and self-bonding of the preferred compositions result in substantially no voids being left in a mass of the composition when the wire or test probe is removed. Thus, applicants have discovered compositions and connectors which eliminate or substantially reduce the problems and disadvantages associated with the above-noted prior art materials and devices.

The present compositions preferably comprise a minor proportion by weight of elastomeric thermoplastic polymer and a major proportion by weight of extender for the polymer.

One important aspect of certain embodiments of the present compositions resides in the particular extender used. In particular, it is highly preferred that the extender comprise a primary extender for the elastomeric thermoplastic polymer and a secondary extender for the elastomeric thermoplastic polymer. It is especially preferred that the primary extender comprise a low solvency latent extender and that the secondary extender comprise a high solvency latent extender. These terms refer to the relative ability of the extenders to swell, plasticize and dissolve the polymer in certain useful temperature regimes.

Another important aspect of certain embodiments of the present compositions resides in the particular thermoplastic elastomer used. Preferably the elastomeric thermoplastic polymer comprises a molecular composite of primary and secondary elastomeric thermoplastic polymers. For the purposes of convenience, the primary elastomeric thermoplastic polymers of the present invention are sometimes referred to herein as "primary polymers" and the secondary thermoplastic polymers are sometimes referred to herein as "secondary polymers." As the terms are used herein, "primary polymer" and "secondary polymer" are used in a relative sense. That is, these terms are used to identify polymeric materials having large differences in physical properties, and particularly polymeric materials having large differences in melt viscosity characteristics. In particular, the term "secondary polymer" is used to identify those polymers which contribute at least to the substantial elastic memory, it is believed, by virtue of their high melt viscosity when plasticized by the extenders. It will be understood that melt viscosity is directly dependent on and related to about the relatively third power of the polymeric molecular weight which, it is believed, also critically determines the elastic memory. "Elastic memory" denotes the ability of an artifact to return its original shape subsequent to the release of a deforming stress. The polymers' molecular weight and elastic memory are characterized preferably by measuring their melt viscosity at a concentration of 5% by wt. in an extender, KAYDOL Oil, at 300° F. By so characterizing, the "secondary polymers" have melt viscosities at least about 50 times greater than the same property of the primary polymer. According to especially preferred embodiments, this viscosity of the secondary polymer is at least about 100 times, and even more preferably about 200 times greater than the viscosity of the primary polymer.

The primary polymers of the present invention preferably contribute to at least the following desirable properties of the polymer composite: thermal insulation; electrical insulation; cohesive strength; adhesive strength; lubricating ability; resistance to temperature excursions and the ability to resist slump or spew while maintaining flowability at moderately elevated temperatures. The secondary polymers of the present invention preferably contribute to at least the substantial elastic memory of the polymer composite. Although it is contemplated that the primary polymer may comprise a diblock and/or a triblock copolymer, in a preferred embodiment the primary polymer consists of diblock copolymer and the secondary polymer consists of a triblock copolymer.

The relative proportions of the polymer and the extender are preferably selected to provide the composition with substantial elastic memory under ambient and moderately elevated temperatures. According to other preferred embodiments, the compositions also possess: a high degree of resistance to penetration and permeation by aqueous media; melt processability; substantially no stratification and/or component separation during temperature cycling; an ability to bond to solid objects inserted into the composition; high cohesive strength; high adhesive strength to juxtaposed connector members; high electrical and thermal resistivity; high strain relief; high material inertness; lubricity and corrosion protection for associated connector members.

According to another aspect of the present invention, the proportions of the components of the compositions are modified so that the compositions may be utilized as primers for treating the inside of an electrical connector.

Applicants have also discovered advantageous methods for preparing the present sealant compositions. The present methods preferably require mixing the organic elastomeric thermoplastic polymer and the extender under easily achieved time and temperature conditions sufficient to produce an at least partially gelled organic polymer/extender composition, as evidenced by a substantial increase in the viscosity of the mixture. The present methods offer substantial advantages over the methods required to prepare prior art compositions. For example, the amount of energy required to produce sealant compositions according to the present methods is small relative to prior art methods. This arises, at least in part, from elimination of the requirement for lengthy high shear mixing and/or extremely elevated temperature processing required by the prior methods.

The present invention also provides moisture and temperature resistant electrical connectors for sealingly connecting transmission means. Such connectors include a connector body having a receiving means for accepting and receiving a transmission means and a sealant composition disposed along or adjacent to the receiving means. The preferred connectors also include means for inhibiting unwanted removal of the sealant composition from the connector body. According to especially preferred embodiments, the removal-inhibiting means also comprises means for wiping sealant from solid objects, such as said transmission means, upon removal of said objects from the connector body. According to another preferred connector embodiment, the sealant composition disposed along or adjacent to the receiving means of the connector body comprises a sealant composition according to the present invention. Due in large part to the beneficial characteristics and properties of the present sealants, such connectors provide a highly moisture and temperature resistant, readily repairable and/or modifiable electrical connection.

Methods for using the present sealants to establish a moisture resistant, readily repairable connection are also provided.

DETAILED DESCRIPTION OF PREFERRED EMBODIMENTS

THE COMPOSITIONS

Figure 1:
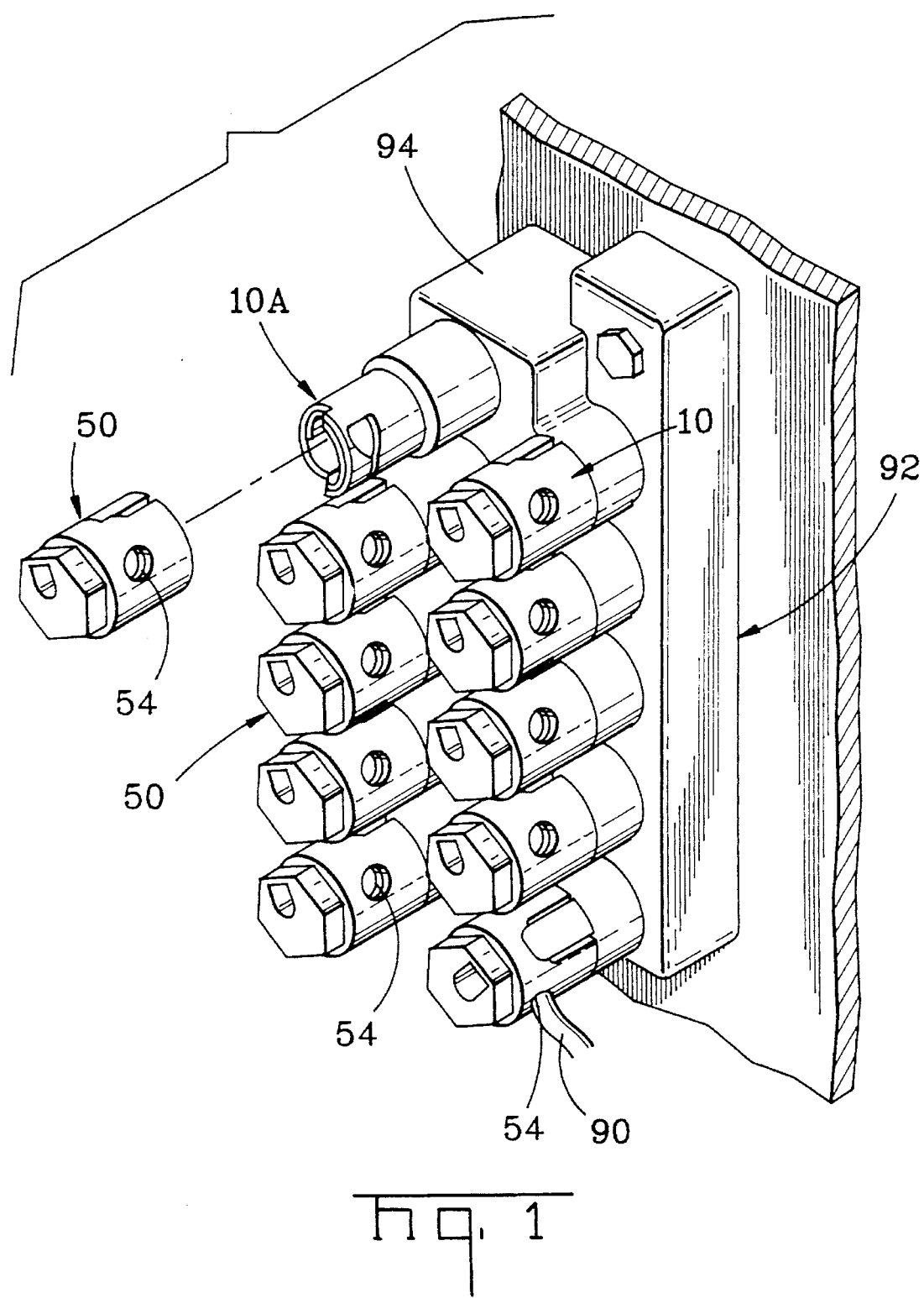
FIG. 1 is a perspective view partially exploded showing an array of silo-type rotary insulation displacement electrical connectors.

The present invention provides sealant compositions requiring two essential components: elastomeric thermoplastic polymer, preferably an organic polymer composite comprising diblock and triblock copolymers, and extender for the polymer.

An important aspect of the present invention is the requirement of certain embodiments that the extender comprise a primary and secondary extender. Applicants have found that the secondary extender preferably comprises, and more preferably consists of, a high solvency latent extender. As the term is used herein, "high solvency latent extender" refers to an extender which has substantially no capacity to form a functional solution or gel of the elastomeric thermoplastic polymer at temperatures below about 40° C. while exhibiting a substantial swelling and dissolving capacity at temperatures above about 80° C. It is preferred that the primary extender of the present invention comprise, and preferably consist of, a low solvency latent extender. As the term is used herein, a "low solvency latent extender" refers to an extender which has no substantial capacity to form a functional solution or gel of the elastomeric thermoplastic polymer of the present invention below about 80° C. and has substantial dissolving capability only at temperatures above about 125° C. It should be understood that this dissolving capability resides in the ability to solvate the polymer molecules and is also manifested in the relative plasticizing capability of the extenders.

Another important aspect of the present invention is the requirement of certain embodiments that the elastomeric, thermoplastic polymer comprise a composite of primary polymer and secondary polymer. The term polymer molecular composite is used herein to designate polymer compositions comprising two or more polymeric compounds, preferably two or more polymeric compounds mixed together in intertwined domains or in interspersed domains. Thus, the term polymer molecular composite includes within its scope simple microscopically and sub-microscopically cellular mixtures of two or more polymers, interpenetrating polymer networks, graft copolymers, block copolymers and combinations of these. It is contemplated that one or more of the above-noted polymeric configurations may be included in the structure of the present polymer molecular composites.

Importantly and desirably, the physical characteristics of the present compositions vary according to, among other conditions, the temperature of the composition. As will be understood by those skilled in the art, sealant compositions must be operative over definite time and temperature service ranges. That is, it is generally required that the sealant compositions maintain important specified characteristics substantially over an entire range of expected operating temperatures. Two such characteristics are that the compositions must be slump and spew resistant, even at the relatively high end of the operating temperature range. In order to maintain these characteristics at high temperatures, many prior art sealants were stiff or rigid and difficult to process because of their high content of extender retaining components. Applicants have discovered, however, that the sealants of the present invention are capable of being flowable and thus easily processed at moderately elevated temperatures without sacrificing the operating requirements of the sealant. Unless otherwise specifically indicated, the term "flowable" refers to the ability of the compositions to become fluent or viscid upon the application of shear stress or pressure.

As reported herein, the flowability of the present sealants is measured by exposing about 50 grams of the sealant in the cylindrical chamber of a standard hot melt gun to an extrusion pressure of about 30 psi at about 163° C. for about 3 seconds and measuring the weight of sealant extruded from the gun. For purposes of defining flow conditions, the extrusion pressure is used as an expression of shear stress. The flowability measurements presented herein are obtained using a hot-melt extrusion gun available from Fastening Technology, Inc. of Charlotte, N.C. sold under the trade name "PAM-Model 500-E." Such a gun is provided with a 0.048 inch inside diameter type B nozzle. Such a nozzle is available from AMP Incorporated as part number 91H195.

Although the amount of flow may vary widely within the scope of the present invention, it is generally preferred that the present compositions exhibit at least about 0.1 g per 3 sec. (2 g/min.), and even more preferably at least about 0.5 g per 3 sec. (10 g/min.) of flow at about 160° C.

As reported herein, the spew resistance (oil retention/extender retention) of a sealant is measured according the protocol expressed in Federal Specification #321.1. Generally, measurement of spew resistance comprises loading the defined weight of sealant into a conical container having walls consisting of a stainless steel mesh as specified according to the federal standards. The amount of material which migrates from the conical container after the specified time period at the specified temperature is a measure of the ability of the present sealants to resist spewing or exudation of the extender portions thereof. The spew resistance is reported herein as percent extender retention and is determined by dividing the sealant weight contained in the conical container after the test by the weight of sealant at the start of the test. Although the amount of spew resistance may vary widely within the scope of the present invention, it is generally preferred that the present compositions exhibit a spew resistance of at least about 99% extender retention at about 80° C., and even more preferably at least about 99.5% at about 80° C.

As reported herein, slump resistance is measured by a modified version of ASTM Test method D2202. In general, the unmodified ASTM Test D2202 requires formation of a cylindrical cavity in a metal sheet or slab by withdrawing a mating cylindrical body or piston from the slab. This cavity is then filled with the material to be measured. According to the unmodified version of the test method, the slab is placed in a vertical position, and the piston is then driven forward to occupy one-half of the original cavity space, thus causing about one-half of the original test material volume to be displaced past the surface of the slab. Upon heating to the test temperature, the amount of downward droop or movement of the displaced material is measured. According to the modification utilized herein, the piston is driven forward to occupy all of the original cavity volume such that face of the piston is flush with the surface of the slab. As a result, the entire body of sealant is displaced from the cavity. In this way, the modified ASTM test D2202 measures not only the slump resistance of the sealant material, but also its adhesive properties. Although the amount of slump resistance may also vary widely within the scope of the present invention, it is generally preferred that the present compositions exhibit a slump resistance of less than about 0.5 in. of slump, and even more preferably less than about 0.2 in. of slump at about 80° C.

Although the operating temperature range of any particular sealant will depend upon numerous factors regarding the expected application, the present sealant compositions preferably have an operating temperature range of from about −40° C. to about 125° C. At relatively low temperatures, for example, from about −20° C. to about 80° C., the present compositions are preferably especially soft, tacky and rubbery. At relatively elevated temperatures, for example above about 125° C. to about 50° C., the compositions are flowable while substantially resisting spew and slump, thus enabling the material to be more easily handled during the process of incorporating the sealant into the connector.

For temperatures of from about −40° C. to about +80° C., the present compositions preferably exhibit an elastic memory of at least about 100 to 150%, and even more preferably at least about 200 to 300%. As the term is used herein, elastic memory refers to the ability of a composition to return to about its original configuration after being subjected to the designated extent of elongation. The high degree of elastic memory exhibited by the present compositions provides sealants with a highly advantageous "self-repairing" property. That is, the present sealants will deform to accommodate stress exerted by, for example, the insertion of an electrical wire into a mass of the sealant. Upon removal of the wire and hence the accompanying stress, the exceptional elastic memory of the present compositions causes the mass of sealant to return to substantially its original shape and thereby to substantially fill the void resulting from the removal of the wire. This self-repairing quality of the present sealants is one important aspect of the present invention. Another important aspect is the ability to self-heal while self-repairing. In addition, the sealants of the present invention maintain their bond with and move with the wires when flexed functionally maintaining the integrity of the seal.

For temperatures of from about −40° C. to about +80° C., the present compositions preferably have an adhesive strength of from about 2 g to about 12 g, and even more preferably of from about 5 g to about 12 g. Applicants have found that the adhesive strength of the present sealant compositions is related to the ability of the compositions to provide a sealed electrical connection, and that the use of high adhesive strength compositions will generally produce high quality electrically insulated connections. As the term is used herein, adhesive strength refers to the amount of force, as measured by gram weight under standard gravity conditions, required to remove an 18½ gauge PVC covered electrical wire from a mass of sealant contained in a standard terminal block silo. The measurement of adhesive strength is preferably made by inserting about ¼ inch of the PVC covered wire into the sealant-filled terminal block silo and measuring the amount of force required to remove same. As used herein, the term standard terminal block silo refers to a substantially cylindrical connector housing having a height of about 11 mm, an inner diameter of about 14 mm, and a free volume of about 1.6 ml, with a substantially circular access opening of about 5 mm diameter in a sidewall thereof.

The excellent ability of the present compositions to effectively seal electrical connections is also due, at least in part, to the combination of high elastic memory and high adhesive strength exhibited by the compositions disclosed herein. In particular, the high wetting and conformability and elastic memory of the present compositions result in a material which strongly captivates objects, such as electrical wires, inserted into a mass thereof. This feature, along with the high insulation resistance and the strong tendency of the present compositions to adhere to such objects, produce an effective and long-lived isolation of the electrical connections from the surrounding environment.

The present compositions also preferably have a high cohesive strength. For the purposes of convenience and illustration, cohesive strength is measured herein by determining the gram weight of sealant which is removed from a standard connector silo when an 18½ gauge PVC covered steel electrical wire is removed from a mass of sealant contained in a standard terminal block silo. The measurement of cohesive strength is preferably made by inserting about ¼ inch of the PVC covered wire into a standard sealant-filled terminal block silo and measuring the amount of sealant which is removed from the silo when the wire is removed. The cohesive strength is therefore used herein to refer to the tendency of sealant to remain as a unit mass in the connector silo when the 18½ gauge PVC covered electrical wire is withdrawn, as will typically occur during repair and/or replacement of electrical connectors. For temperatures of from about −40° C. to about +80° C., the present compositions preferably have a cohesive strength as measured by sealant removal of no greater than about 0.2 g, and even more preferably no greater than about 0.04 g.

Another important aspect of certain embodiments of the present invention resides in sealant compositions having both high adhesive strength and high cohesive strength. In particular, it will be generally understood by those skilled in the art that a sealant composition possessing one but not the other of these characteristics will not fully satisfy the objects of the present invention. For example, the use in an electrical connector of a sealant which is high in adhesive strength but low in cohesive strength will result in a large amount of sealant being withdrawn from the connection site during repair or replacement of the connection. On the other hand, the use in an electrical connector of a sealant which possesses high cohesive strength but low adhesion properties will likely produce a poor quality electrical connection seal. Accordingly, the present sealant compositions preferably have an adhesive strength of from about 2 g to about 12 g and a cohesive strength as measured by removal weight of from about 0 g to about 0.2 g at temperatures of about −40° C. to about +80° C. Even more preferably, the present compositions have an adhesive strength of from about 5 g to about 12 g and a cohesive strength of from about 0 g to about 0.02 g at temperatures of from about −30° C. to about +60° C.

Although applicants do not wish to be necessarily bound by or limited to any particular theory, it is believed that the ability of the preferred compositions to exhibit the above-noted combination of beneficial properties is due, at least in part, to the physical and chemical relationship between the components of the present composition. In particular, the combination of an elastomeric thermoplastic polymer and an extender according to the present invention is believed to contribute to the beneficial properties of the compositions. For example, it is contemplated that the mixture of the diblock and triblock elastomeric thermoplastic polymers according to preferred embodiments comprises an interpenetrating polymer network (IPN). It is believed that the presence of such a polymer network, especially in the presence of optional inorganic gelants, maintains the extender portion of the present compositions in a highly stable dispersed, colloidal, gelled and/or networked (reticulated) or fused state in which exudation or spewing of the extender is strongly inhibited. In addition, it is believed that such a configuration contributes to the high cohesive strength of the present compositions.

In certain embodiments of the present invention, the extender hereof may itself include polymer components, as explained more fully hereinafter. It is contemplated that in such embodiments, the extender may participate in and be part of the IPN of the present invention, thereby further enhancing the adhesive strength and exudation resistance of the present compositions.

As those skilled in the art are aware, interpenetrating polymer networks (IPNs) are a special class of polymer molecular blends in which two or more polymers exist in a highly networked structure. As the term is used herein, interpenetrating polymer network refers to true IPNs, apparent IPNs, semi-IPNs, and combinations and hybrids of these. As the term is used herein, a true IPN refers to those polymer network domains in which two or more polymer systems are crosslinked within their own domains but not to each other. In true IPN's, the distinct polymer systems form crosslinked network domains that interpenetrate each other. As the term is used herein, a semi-IPN refers to those polymer networks in which one polymer system exists in an uncrosslinked state but interpenetrates a second polymer system which is crosslinked and has its own domain.

The term physical IPN as used herein refers to co-continuous interpenetrating phases in which none of the polymers is chemically crosslinked but which is nevertheless stabilized by physical polymer crosslinks which may be provided, for example, by the styrene end blocks of styrene-ethylene-butylene-styrene block copolymers. As explained more fully hereinafter, it is believed that the preferred polymer composites of the present invention are believed to comprise a polymer network structure having characteristics of a physical IPN. Additionally, the preferred polymer composite properties may be enhanced by inorganic network formers such as "fumed" silica, i.e. amorphous silica with particle sizes as defined by surface areas of about 100 to 300 sq.m./g.

It is contemplated that the preferred IPNs of the present invention may be formed using a variety of techniques and all such techniques are within the scope of the present invention.

While the mechanisms which create the observed properties and characteristics of the present compositions are not to be construed as fully explained by present technology, it is believed that the preferred embodiments of the present invention comprise compositions in the form of a thermally reversible polymeric gel state. In particular, the present compositions exhibit characteristics which are sometimes associated with thermally reversible polymeric gels.

For example, reversible polymeric gels are elastomeric and non-flowable under certain conditions but are converted to a liquid-like, flowable state when the condition of the gel is altered, for example, by increasing temperature. Thus, it is believed that the present compositions, especially when the components are in the preferred ranges described below, are in the form of a reversible polymeric gel in which the extender is contained as a colloidal dispersion or solution of liquid in a polymer composite comprising effectively, i.e. functionally, crosslinked thermoplastic elastomer and other polymers.

A. Elastomeric Thermoplastic Polymer

As the term is used herein, organic thermoplastic elastomers are those organic polymers which possess, or which may be plasticized to possess, elastomeric properties under a first set of temperature conditions and which are flowable under a second set of temperature conditions. It is generally preferred that the present elastoplastic polymers are elastomeric at temperatures of from about −40° C. to at least about +150° C., and that the polymers become flowable yet thermally stable at temperatures of from about +150° C. to at least about +200° C. in their neat uncompounded state. It is generally preferred that at ambient temperatures the thermoplastic elastomer used in the present polymer composites is sufficiently rigid to retain its general shape and dimension and sufficiently flexible to exhibit substantial recovery upon stretching. As used herein, the term organic polymer refers to polymeric materials in which at least a portion of the polymer backbone is comprised of carbon atoms.

According to specially preferred embodiments, the elastomeric thermoplastic polymer comprises a composite of a primary polymer and a secondary polymer. While it is contemplated that all such composites are adaptable for use according to the present invention, composites comprising a physical mixture of block copolymers has been found to be especially useful and is preferred. It is even more preferred that the present compositions comprise an elastomeric thermoplastic polymer composite in the form of a physical IPN comprising block copolymers, and even more preferably comprising diblock and triblock copolymers.

It is also contemplated that the relative proportions of primary and secondary polymers may vary over a wide range within the scope of the invention. Such variation will depend, for example, on the particular type of connector in which the sealant composition will be used and the contemplated operating environment for the connector. In general, however, applicants have found that the elastomeric thermoplastic polymer of the present invention preferably comprises a physical IPN, and even more preferably, an IPN comprising a major proportion by weight of primary polymer and a minor proportion by weight of secondary polymer. It is especially preferred that the weight ratio of secondary polymer to primary polymer be smaller than about 1:5, and more preferably no greater than about 1:10. Applications have also found that it is generally highly desirable for the present polymer composites to comprise at least 0.4% by weight of secondary polymer. Accordingly, the polymer composites of the present invention preferably have a secondary polymer:primary polymer weight ratio of no smaller than about 1:20. Without intending to be bound by or limited to any particular theory, it is believed that compositions containing smaller than the above-noted polymer ratio will not possess certain of the desirable and beneficial properties exhibited by the present compositions. For example, the ability of the sealant compositions to remain within the connector during normal operating conditions have been found to deteriorate in certain embodiments when the above-noted lower limit of secondary polymer is not satisfied.

Numerous block copolymers exhibiting elastoplastic properties are known, readily available and within the broad scope of the present invention. The block copolymers used in the present polymer composites preferably contain at least one elastomeric block and one non-elastomeric block. Such block copolymers are referred to generally as A-B diblock copolymers wherein A represents a block of non-elastomeric polymer and B represents a block of elastomeric polymer connected thereto. As the terms are used herein, a block of elastomeric polymer refers to a polymer which can be stretched at about room temperature to at least twice its original length and, after having been stretched and the stress removed, returns with force to approximately its original length in a short time period. In contrast, non-elastomeric blocks according to the present invention do not exhibit this characteristic.

The elastomeric B blocks of the present block copolymers are preferably selected from the group consisting of non-aromatic polyolefins, polyesters, polyethers and combinations of these, with non-aromatic polyolefins being preferred. Polyolefins formed from conjugated dienes, such as butadiene and isoprene, and the partially or fully hydrogenated forms thereof and polyolefins formed from propylene, ethylene, butene and combinations thereof, are especially preferred. It is contemplated that block copolymers having a large variety of chemical constitutions are adaptable for use according to the present invention, since the elastoplastic characteristics are believed not to depend on any specific chemical constitution, but rather upon the polymeric architecture of each of the polymer blocks. Thus, block copolymers having linear, radial or branch structures are generally within the scope of the present invention.

The non-elastomeric A blocks are preferably selected from the group consisting of poly (alkenyl arenes), polyurethanes and combinations of these, with poly (alkenyl arenes) being preferred. The non-elastomeric A blocks may comprise homopolymers or copolymers but preferably are homopolymers prepared from alkenyl arenes, such as styrene, methyl styrene, vinyl xylene, ethylene vinyl xylene, isopropyl styrene, vinyl naphthalene and the like, with monoalkenyl monocyclic arenes, such as styrenes, being preferred.

Especially preferred block copolymers are diblock and triblock copolymers. The diblock copolymers have the general configuration A-B with about one A block for each B block, and the triblock copolymers have the general configuration A-B-A wherein the polymer predominantly contains A blocks at the end of each B block. It is especially preferred that each A block is "hard" crystalline, semi-crystalline or glassy polymer end block segment, such as polystyrene and that B is a "soft" elastomeric polymer mid-block segment, preferably comprised of a non-aromatic polyolefin, such as polyethylene, polypropylene, polybutylene and/or combinations of these. The non-aromatic polyolefin segments of such diblock and triblock copolymers are generally poorly compatible with the "hard" end-block and form a microscopic two-phase morphology consisting of domains of glassy end blocks interconnected by flexible mid-block chains. The physical elastomeric network structure of such diblock and triblock copolymers is reversible, and heating the polymer above the end-block glass transition temperature will temporarily disrupt the structure, which can be restored by lowering the temperature.

Triblock copolymers as described herein can be prepared according to a number of well-known techniques, including the methods described in U.S. Pat. No. 3,485,787—Haefele, which is incorporated herein by reference.

It is contemplated that the elastomeric thermoplastic polymer of the present invention may also comprise thermoplastic polyurethane elastomers and thermoplastic polyester/polyether elastomers. In general, such polyurethanes are addition polymers obtained from the chemical reactions of isocyanates. Isocyanates commonly used in the formation of polyurethanes are toluene diisocyanate, diphenyl methane diisocyanate isophorone diisocyanate and polymeric diisocyanates (PMDI), polymers derived from the condensation of aniline with formaldehyde. Polyurethane and polyester/polyether thermoplastic elastomers are alternating block copolymers having segments of the "hard," highly polar or crystallizing material, such as polyurethane, linked by "soft" segments of amorphous materials, such as polyester which are rubber-like at normal temperatures.

The present compositions preferably comprise a minor proportion by weight of organic thermoplastic elastomer. It is especially preferred that the sealants of the present invention comprise less than about twenty percent, and even more preferably less than about ten percent, by weight of organic thermoplastic elastomer.

B. The Extender

Applicants have found that the extenders of the present invention impart highly beneficial and advantageous characteristics to the sealant compositions and to the methods by which such compositions are prepared. In particular, extenders comprising a combination of both primary and secondary extenders contribute to the surprising and unexpected rheological properties of the present compositions.

For the purposes of convenience but not by way of limitation, the extenders of the present invention can generally be classified as either primary or secondary extender. When the polymer-to-extender attraction is strong, the extender has high compatibility with and high solvency for the thermoplastic elastomer and is said to be a secondary extender. Where the polymer-to-extender attraction is relatively weak, the extender is of the primary type. Primary extenders function as spacers between polymer chains but, according to prior processes, could not generally be used exclusively of secondary extenders because of limited compatibility. This lack of compatibility was frequently manifested in prior materials by a tendency of the extender to exude or spew from the composition under conditions of elevated, cyclical temperature and/or stress.

In the present compositions, however, the tendency of the extender to exude or spew is greatly reduced or eliminated. Applicants believe that this advantage is provided, at least in part, by the IPN type structure of the preferred polymer composites of the present invention. In addition to the benefits provided by the elastomeric thermoplastic polymer, the present compositions also benefit from the use of the preferred secondary extenders. In particular, applicants have found that it is highly preferred for the secondary extenders to comprise high solvency latent extenders. The incorporation of such high solvency latent extenders in the present compositions provides the advantageous properties associated with primary extenders without the disadvantages typically encountered by the use of such extenders in prior art compositions. In particular, applicants have found that the high temperature solvating power of high solvency latent extenders tends to reduce spewing or extruding associated with other primary extenders. Moreover, the increased high temperature solubility is also believed to enhance the flowability of the compositions at increased temperatures and to enhance the formation of the gel network structure. On the other hand, the lack of solubility at relatively low temperatures allows the extender material to be maintained in a gel-type matrix without detracting from the elastomeric properties of the sealant. In addition, the low solvency latent extender is beneficial in that it tends to reduce the stiffness and increase the softness of the composition under conditions of use. Moreover, the presence of the low solvency latent extender in the composition contributes to the ability of the preferred compositions to "wet-out" and to be affined to the components of the electrical connectors, thereby providing excellent sealing properties.

In general, the extender of the present invention generally performs one or more of several functions, and accordingly a large number of available extenders may be utilized, provided the requirements described herein are satisfied. For example, particular extenders may be chosen to increase or decrease the workability, flexibility and/or distensibility of the thermoplastic elastomers of the present invention, depending upon the particular application. As is well known to those skilled in the art, extenders are generally high boiling, chemically and thermally stable organic liquids, low-melting solids or semi-solids.

The extender is preferably present in a large weight percentage of the composition in order to reduce the overall cost of the compositions without negatively affecting the beneficial properties thereof. With the guidance provided herein, it is expected that one skilled in the art will be capable of selecting the extender needed for any particular application without undue experimentation.

An important aspect of the present invention resides in the ability of the extender to fluidize, solvate, gel and/or fuse with the thermoplastic elastomer and/or the inorganic crosslinked polymer. In this regard, it is believed that the extenders of the present invention achieve the desired result through external plasticization of the present compositions. That is, it is believed that the present extenders interact primarily physically and not chemically with the components of the above described polymer composite to reduce the mutual attractive forces between polymer chains in the sealant compositions. Accordingly, while the compositions of the present invention may include a certain amount of internal plasticization, such as, for example, copolymerization of the extender with the polymer blend, this is not believed to be necessary or desirable for operation of the present invention. Thus, the extenders of the present invention preferably serve to aid in the processing characteristics of the present compositions to impart flexibility, elongation and toughness to the compositions without reacting chemically therewith. It is generally preferred that the present extenders are relatively viscous materials having a pour point of about 0° C. or less, and even more preferably from about −30° C. to about 0° C.

It is contemplated that numerous known and available materials may be used as primary and secondary extenders according to the present invention. The particular primary and secondary extenders selected will depend upon factors such as expected conditions of use, expense and other components in the composition. It is contemplated that those skilled in the art will be able to select appropriate primary and secondary extenders for any particular application in view of the information provided herein. For compositions in which the elastomeric thermoplastic polymer comprises a combination of diblock and triblock copolymer, it is preferred that the secondary extender be selected from the group consisting of naphthenic oils, white oils and terpenoid hydrocarbons and that the primary extender be selected from the group consisting of polybutadiene, polybutene, polybutylene, hydrocarbon resins, atactic polypropylene, branched polyethylene and low molecular weight styrenic polymers. The extenders of the present invention may comprise numerous and varied combinations of particular extenders provided that the requirements described above are satisfied.

The extender of the present invention is preferably selected from the group comprising one or more of the following: aliphatic hydrocarbons, such as aliphatic mineral oil; aromatic hydrocarbons, such as aromatic mineral oil; C1–C6 non-aromatic polyolefins, such as polybutene; ester compounds, such as monomeric phthalate esters, dibasic acid esters, trimellitates, phosphate esters and polyesters; glycol benzoates; citrates; isophthalates; chlorinated hydrocarbons; sebacates and mixtures and combinations of the these.

Applicants have found that compositions with highly preferred properties are obtained when the primary extender comprises, preferably in major proportion, C1–C4 polyolefin, with C4 polyolefin being preferred and polybutene and polybutadiene even more preferred and polyisobutene being even still more preferred. Applicants have found that primary extenders comprising such polyolefins, especially primary extenders comprising at least about 90 percent by weight of low molecular weight highly paraffinic polybutenes and polyisobutylenes, are capable of enhancing the adhesive properties of the sealant, thus contributing to the ability of the composition to seal electrical contacts from corrosive environments. Such materials are available from Amoco Chemical under the trademark INDOPOL H-100 and from Exxon under the trademark VISTANEX LM-MS. With respect to polybutene and polyisobutylene extenders, the term low molecular weight is used herein to refer to such materials having a viscosity average molecular weight (Staudinger) of about 8700 to about 11700. Molecular weights of from about 8700 to about 10000 are especially preferred for applications requiring strong adhesion strength. It is also preferred that the C1–C4 polyolefins have a pour point of about 32° F. or less, and even more preferably from about 5° F. to about 32° F. Such a polybutene extender is available from Amoco under the designation INDOPOL H-100.

According to preferred embodiments of the present invention, the secondary extender comprises mineral oil. Without being bound by or limited to any particular theory, it is believed that the presence of mineral oil as the secondary extender contributes to the wetting ability of the composition. The mineral oils of the present invention are preferably relatively high viscosity mineral oils having an SUS at 100° F. of from about 300 to about 600, a specific gravity at about 25° C. of about 0.85 to about 0.89, and a pour point of from about −25° C. to about 0° C. A preferred material is available from the Sonneborn Company, a division of Witco Corp., under the designation KAYDOL. Mineral oil sold under the trade name BRITOL 55T from Malcolm Nicol & Co., Inc., Lindhurst, N.J., is also a preferred mineral oil for use in the extender of the present invention.

Applicants have found that compositions with highly preferred properties are obtained when the extender comprises, preferably in major proportion, a mixture of secondary and primary extenders, and particularly a mixture of secondary extender comprising aliphatic hydrocarbon and a primary extender comprising C4 polyolefin, with mineral oil being the preferred hydrocarbon and polyisobutene being the preferred C4 polyolefin. Applicants have found that extenders comprising such mixtures, especially extenders comprising at least about 85 percent by weight of such mixtures, are capable of at once providing thermoplastic elastomers with an excellent ability to wet out objects brought into contact with the composition, excellent adhesive strength and excellent cohesive strength. Without being bound by or limited to any particular theory, it is believed that the presence of the secondary extender mineral oil in the extender mixture contributes to the wetting ability of the composition while the primary extender polyisobutene contributes to the adhesive and cohesive strength. It is preferred that the extenders have a primary:secondary polyolefin weight ratio of from about 20:80 to about 70:30, with about 40:60 to about 60:40 being even more preferred. These ratios are also preferred for extenders in which the primary extender is a low solvency latent extender and the secondary extender is a high solvency latent extender. According to a preferred embodiment of the present invention, the extender comprises about 45 parts by weight of mineral oil and about 45 parts by weight of polyisobutene.

It is contemplated that the amount of extender used can vary widely, depending upon such factors as the expected use of the composition, the characteristics of the elastomeric thermoplastic, and the like. An important advantage of the present compositions, however, is the ability to incorporate very large concentrations of extender in the composition without negatively affecting the beneficial properties thereof. Thus, it is highly preferred that the extender:polymer composite weight ratio of the composition is from about 99.5:0.5 to about 85:15, and even more preferably from about 93:7 to about 88:12. For the purposes of determining this ratio, the composite weight is the weight of the diblock and triblock organic thermoplastic elastomeric polymers together.

C. Other Components

It is contemplated that the present sealant compositions may include other components which provide other desirable properties to the sealant composition without detracting from the beneficial characteristics mentioned above.

It is contemplated that corrosion inhibitors, preferably minor amounts thereof, may be included in the present sealant compositions to enhance the integrity of the connection. Such inhibitors are available in wide variety of types and grades and from a wide variety of sources, and all such inhibitors are within the scope of the present invention. High molecular weight synthetic barium sulfonate is a corrosion-inhibiting material available under the trade name NA-SUL BSN from the R. T. Vanderbilt Company in Norwalk, Conn. Chemisorption components, preferably benzotriazole, are available from PMC Incorporated under the trade designation COBRATEC 99 and may be incorporated in minor amounts in the present compositions.

Antioxidants and thermal stabilizers may also be incorporated, preferably in minor amounts, in the present sealing compositions. Preferred antioxidant/thermal stabilizers are hydroxyhydrocinnamate based compounds available from Ciba-Geigy Corporation, Hawthorne, N.Y., under the trade designation, IRGANOX, as described in Ciba-Geigy bulletin "IRGANOX®1010, Antioxidant and Thermal Stabilizer" (1990). A mixture of IRGANOX 1010 and IRGANOX 1035 is preferred. Other antioxidants are available from the American Cyanamid Company, Wayne, N.J., under the trade designation "CYANOX." Particularly preferred CYANOX compounds are CYANOX 1790 and CYANOX LTDP.

The present compositions may also contain light and heat stabilizing components, preferably in minor amounts. One such stabilizer is available from the American Cyanamid Company under the trade designation "CYASORB." Especially preferred CYASORB materials are CYASORB UV3346.

The present compositions may also contain minor amounts of fungicides and/or antimicrobials. Such materials are available from Morton International Specialty Chemicals Group, Danvers, Mass., under the trade designation "VINYZENE" and from Calgon Corporation under the trade designation "METASOL TX-100." In certain preferred embodiments of the present invention, the sealant compositions may also include a thickening agent such as silica and preferably fumed silica. Silica may also serve to act as a temperature stabilizing agent. Such materials are available as fully hydrophobized surface treated amorphous silicas from Cabot Corporation under the designations "CAB-O-SIL," such as "CAB-O-SIL TS610" and "CAB-O-SIL TS-530" and from Degussa Corporation under the designation "AEROSIL R-974." Hydrophilic amorphous silicas are available from Cabot Corporation under the trade designation "CAB-O-SIL M-5" and from Degussa Corporation under the trade designation "AEROSIL 200." Incorporation of minor amounts, preferably less than about 8% by weight, of silica into the present compositions tends to favorably control the rheology of the sealant and to enhance the cohesive strength thereof.

The present compositions may optionally include a polymer composite which comprises a crosslinked polymer, preferably an inorganic crosslinked polymer, and even more preferably a crosslinked silicon-based polymer. As the term is used herein, inorganic polymer refers to polymers having inorganic elements making up at least a portion of the backbone of the polymer chain. With respect to the preferred silicon-based polymers of the present invention, silicon atoms contribute to the chemically inert and environmentally benign character of the polymer and are present either alone in the backbone or with atoms of oxygen, carbon, nitrogen, etc. in the backbone. Thus, the term silicon-based polymer is used herein to refer to a wide range of silicon containing polymers, including polysilanes, polysiloxanes, polysilalkylenes and polysilarylenes, with polysiloxanes being preferred. Siloxane polymers are commonly referred to as silicone polymers and will frequently be referred to herein as such.

The siloxane type polymers of the present invention preferably have the general structure shown below and may be prepared, for example, by ring opening polymerization of a trimer or a tetramer:

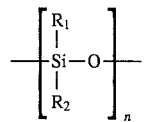

where $R_1$ and $R_2$ are the same or different and are H, OH, alkyl, alkenyl, aryl or aryl-alkyl and n is the degree of polymerization.

The preferred silicon-based polymer of the present invention is at least partially crosslinked. A large variety of crosslinked silicon-based polymers and precursors therefor are available and all such polymers are within the scope of the present invention. For example, crosslinked silicon-based polymers may be formed by reacting functionally terminated siloxane polymer chains with a polyfunctional end linker. It is preferred that the crosslinked polymers of the present invention comprise, preferably in major proportion, crosslinked silicone polymers formed by platinum catalyzed vinyl-addition reactions between hydride- and vinyl-functionalized silicone polymers.

For compositions which contain the optional crosslinked inorganic silicon-based polymer, it is especially preferred that silicon-based polymer is crosslinked in the presence of the thermoplastic elastomer of the present invention. As the term is used herein, a polymer crosslinked in the presence of another polymer refers to chemical crosslinking reactions in which the reactants are intimately intermixed with the other polymer or precursors for the other polymer as the reaction takes place. It is preferred that such intimate mixing during the crosslinking reaction results in the formation of an interpenetrating polymer network.

According to certain embodiments, the present compositions preferably comprise a minor proportion by weight of inorganic crosslinked polymer. It is especially preferred that the sealants of the present invention comprise less than about 35 percent, and even more preferably less than about 25 percent, by weight of inorganic crosslinked polymer. The organic thermoplastic elastomeric polymer and the inorganic crosslinked polymer may together comprise less than about 20 percent, and even more preferably less than about 15 percent, by weight of the composition. Such embodiments are not only advantageous from an economic point of view, they possess surprisingly beneficial results.

The details of the preferred methods for forming the polymer composites of the present invention are described more fully hereinafter.

I. THE CONNECTORS

It is contemplated that the desirable properties of the present compositions will be advantageous in a wide variety of electrical connectors, and all such connectors containing the present compositions are within the scope of the present invention. Moreover, the present invention also provides connectors which eliminate or substantially reduce the tendency of sealant compositions used therewith to migrate or ooze from the connector. Connectors according to such embodiments are adaptable for use with a wide variety of sealant compositions, including those of the type disclosed in the prior art as well as those of the present invention.

The present invention provides moisture proof, temperature resistant and noise resistant electrical connectors for sealingly connecting transmission means therein. The preferred connectors of the present invention comprise a connector body having a terminal means for accepting and electrically connecting to the transmission means inserted appropriately into the connector body and a sealant composition disposed along or adjacent to the terminal means of the connector body. In order to maximize the sealing ability of the connector, the connector body preferably comprises a substantially closed housing or container, and the container is preferably substantially filled with sealant composition. In such embodiments, the container includes access means for allowing entry of the transmission means into the connector body for contact with the terminal means and the sealant composition. The access means preferably comprises said container having an access opening therein.

It will be appreciated by those skilled in the art that, under certain conditions, many of the prior sealant compositions contained in such a container tended to migrate or ooze from the connector body through the access means. While the sealant compositions of the present invention possess properties and characteristics which substantially reduce or eliminate such migration, it is preferred that the present connectors include wiper means substantially covering said access opening for allowing withdrawal of the transmission means from the connector while retaining said sealant within said housing. The provision of wiper means according to the present invention advantageously facilitates repair and replacement of electrical connections. In particular, the wiper means provides ingress and egress to the transmission means while simultaneously substantially reducing the migration of sealant composition, even relatively flowable and migratory sealants, from the connector.

It is preferred that the wiper means of the present invention comprise a resilient thin membrane adhered to the connector body and covering the access opening. Such resilient membrane also preferably includes an access opening therein for permitting entry of the transmission means into the connector body wherein the dimension between at least two edges of said resilient membrane access opening are less than, and preferably substantially less than, the cross-section of said transmission means. In this way, the edges of such opening provide means for wiping sealant composition from the outer surface of the transmission means when the transmission means is withdrawn from the connector body, as frequently is required during repair operations. According to certain embodiments it is preferred that the smallest dimension of the wiper means access opening is at least about 0.2 times the smallest cross-sectional dimension of the transmission means, and even more preferably about 0.1 times the smallest dimension of the connector body access opening.

The resilient membrane used according to the preferred embodiments of the present invention should provide sufficient flexibility to allow the transmission means to be readily inserted and withdrawn from the connector body while simultaneously possessing sufficient rigidity to overcome any adhesion forces between the sealant composition and the transmission means, thereby wiping sealant means from the transmission means during the withdrawal process. While it is contemplated that a large number of materials in varying thicknesses and sizes are adaptable for use according to the present invention, thin polyurethane films having a thickness of from about 1 mm to about 5 mm are preferred.

It is also contemplated that the particular shape and configuration of the access opening in the wiper means will vary depending upon the type of sealant used and particular applications involved. For example, the access opening may comprise a simple slit in the resilient film, a star pattern of slots or an aperture of circular, square or triangular shape.

These and other access openings are all within the scope of the present invention.

A. First Embodiment

A first preferred embodiment of the present invention will now be described in connection with FIGS. 1–11. Connectors of the general type illustrated in these figure are described in U.S. Pat. No. 4,705,340 —Luce and 5,006,077, each of which is incorporated herein by reference and assigned to the assignee of the present invention. These connectors are available from AMP Incorporated under the trade designation "Quiet Front."

Referring now to FIG. 1, a terminal block 100 having a plurality of silo-type rotary insulation displacement electrical connectors 10 is illustrated. The connector housings 10 house a terminal, referred to generally as 10A in FIGS. 2 and 3, substantially closed at the top by mating rotatable cap 50 and at the bottom by, for example, the base 110 of terminal block 100. The terminal 10A is substantially cylindrically-shaped and has a upper insulation displacement portion 8 and a lower insulation displacement portion 6. In operation, the terminal is substantially completely filled with sealant, preferably the sealant composition of the present invention. The terminal parts are preferably stamped from a metal having good electrical conducting qualities. These conductive qualities are desirable because transmission means, preferably two signal-carrying wires, are terminated to the terminals and the signal is carried through the terminal.

Figure 7:
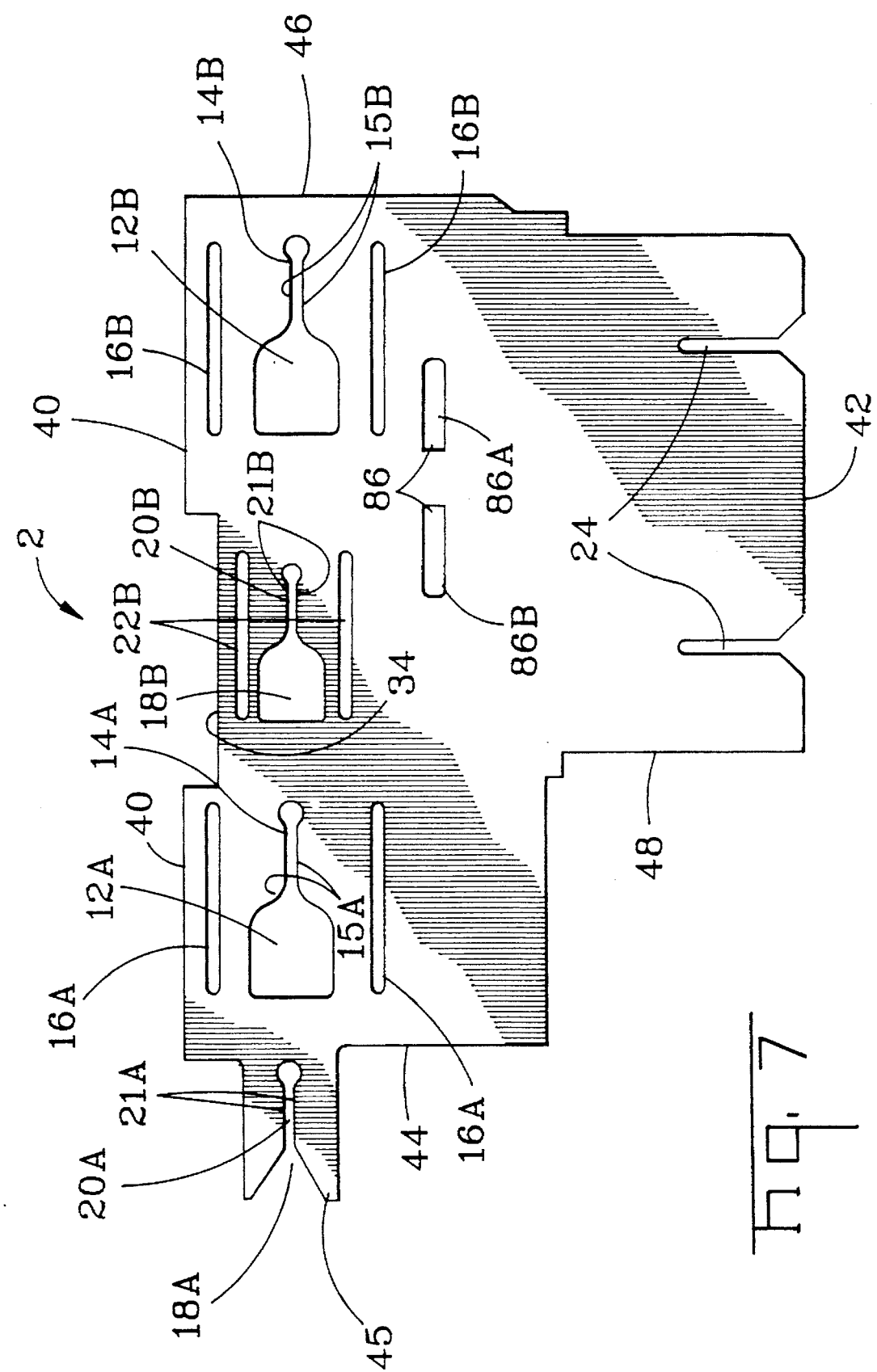
FIG. 7 is a stamped blank prior to being rolled into a connector body.

Referring now to FIG. 7, a preferred method of forming the terminal is disclosed. In particular, the terminal is stamped from a blank 2 having top bearing surfaces 34 and 40, forward surface 44, tab 45 on forward surface 44, bottom surface 42 and a recessed surface 48. Blank 2 includes an inner small wire opening 18A in tab 45, the opening 18A being in transition with an inner small wire receiving slot 20A defined by sheared surfaces 21A. Blank 2 also includes an inner large wire receiving opening 12A in transition with an inner large wire receiving slot 14A defined by sheared surfaces 15A. Strain relief slots 16A are located above and below the large wire opening 12A and large wire slot 14A. The blank 2 includes outer small wire receiving opening 18B in transition with outer small wire receiving slot 20B defined by sheared surfaces 21B, and strain relief slots 22B above and below opening 18B and slot 20B. The blank 2 includes an outer large wire receiving opening 12B in transition with an outer large wire receiving slot 14B defined by sheared surfaces 15B. Strain relief slots 16B are located above and below the opening 12B and slot 14B.

Figure 2:
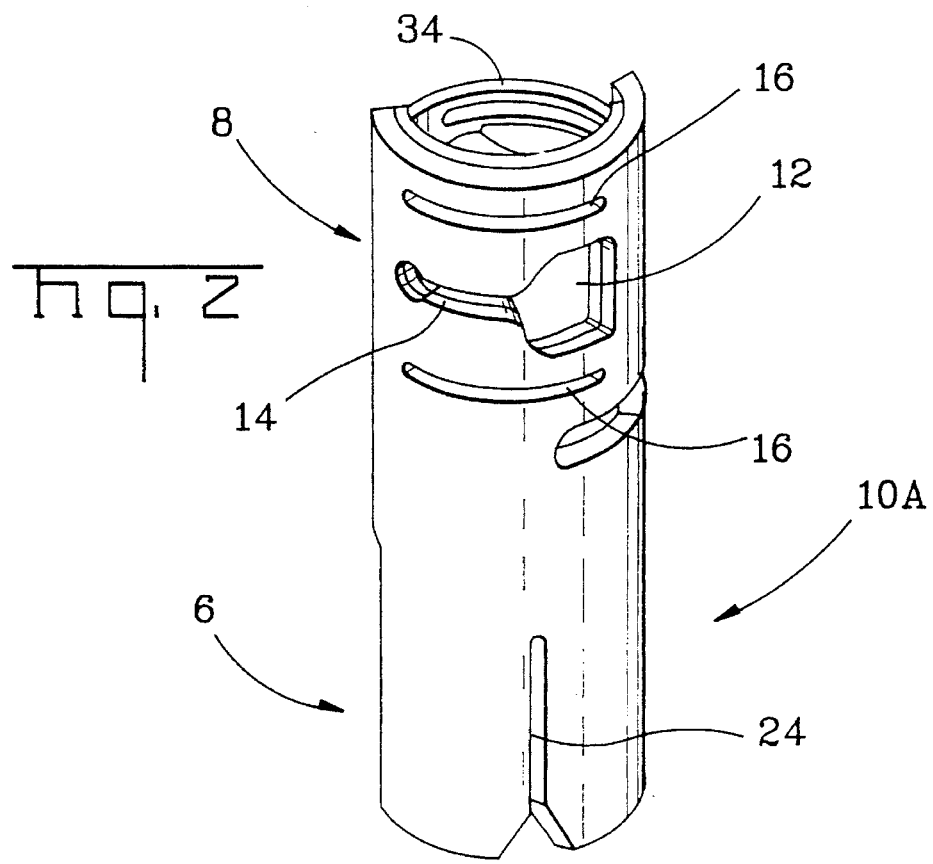
FIG. 2 is a perspective view of a connector body.
Figure 3:
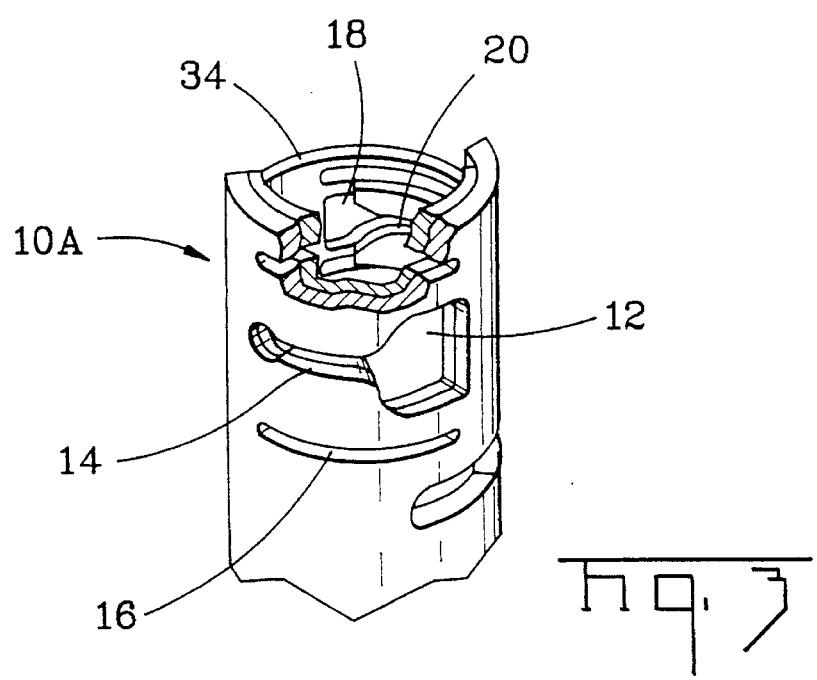
FIG. 3 is a partially cut away perspective view similar to that of FIG. 2.
Figure 4:
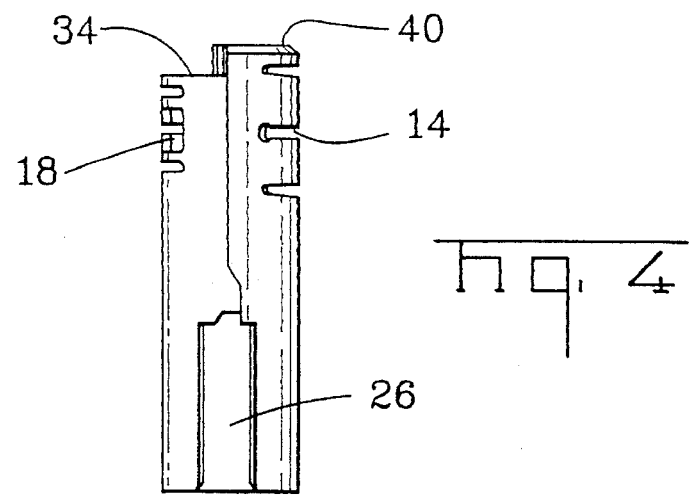
FIG. 4 is a side view of the connector body.
Figure 5:
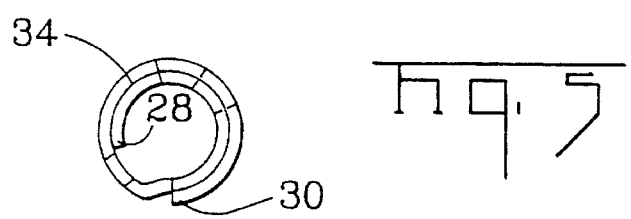
FIG. 5 is a top view of the connector body.

The terminal 10A is formed by rolling the stamped blank of FIG. 7 into cylindrical shape, the cylinder comprising a spiraled double wall thickness as shown in FIG. 5. As best shown in FIGS. 5 and 7, the spiral begins with the end marked 18A. The spiral is then rolled clockwise around the end marked 18A until the outer small wire receiving opening 18B overlaps the inner small wire receiving opening 18A and continues around until the outer large wire receiving opening 12B overlaps the inner large wire receiving opening 12A. As overlapped, the outer large wire strain relief slots 16B also overlap the large strain relief slots 16A. When completely rolled, the terminal is a cylinder having an inner and outer wall of twice the thickness of the metal stamping and having diametrically opposed large and small wire receiving holes, 12 and 18, respectively, as best shown in FIG. 2. The terminal 10A thus includes first access means comprising inner and outer small wire openings 18A and 18B, respectively and second access means comprising large wire inner and outer openings 12A and 12B, respectively. The blank 2 further includes lower insulation displacement slots 24, and cap detention slots 86A and 86B.

Figure 8:
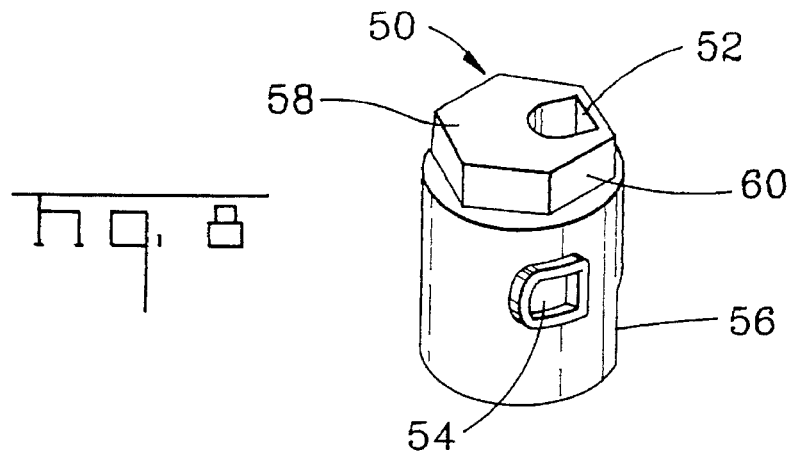
FIG. 8 is a perspective view of the terminating cap.
Figure 11:
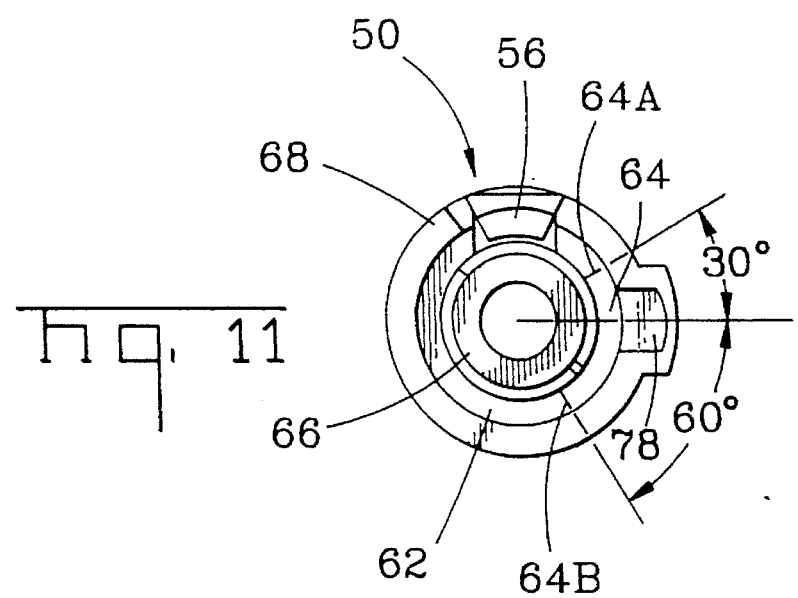
FIG. 11 is a bottom view of the terminating cap.

Referring now to FIGS. 8–11, the connector 10 includes a terminating cap 50, which cooperates with terminal 10A and substantially closes the top end of connector 10. Cap 50 is molded from a dielectric material and includes an outer wall 68 and an inner wall 66 interconnected by a top wall 58, the inner and outer walls 66,68 thereby defining an inner annular channel 62 therebetween. As shown in FIG. 11, cap 50 further comprises rotational lug 64 having surfaces 64A and 64B, detent latch member 56 and small wire receiving channel 78. As shown in FIG. 8, the cap 50 includes hexagonal nut portion 60, continuity test hole 52 and wire entry hole 54. In typical configurations, the hexagonal nut portion 60 rises so as to allow the terminal 10A to accommodate additional sealant material, thereby improving the overall quality of the connection. Wire entry hole 54 comprises large wire entry portion 54A and small wire entry portion 54B, these portions being connected by a frusto-conical transition section defined by surface 76.

Referring now to FIG. 11, it is seen that inner circular wall 66 and outer circular wall 68 of cap 50 define inner channel 62, which is so dimensioned as to be slidably received over the top of terminal 10A; that is, the outer diameter of inner wall 66 is less than the inner diameter of terminal 10A, while the inner diameter of outer wall 68 is greater than the outer diameter of terminal 10A. When cap 50 is received over terminal 10A, wire receiving opening 54 in cap 50 is aligned with large wire receiving opening 12 and opposed small wire receiving opening 18 in terminal 10A. Rotating cap 50 clockwise about a quarter turn aligns wire receiving hole 54 in cap 50 with the large wire receiving slot 14 and diametrically opposed small wire receiving slot 20. In fully assembled form, the wire receiving openings 12 and 18 and the opening 54 in cap 50 individually and together constitute connector body access openings.

Figure 6:
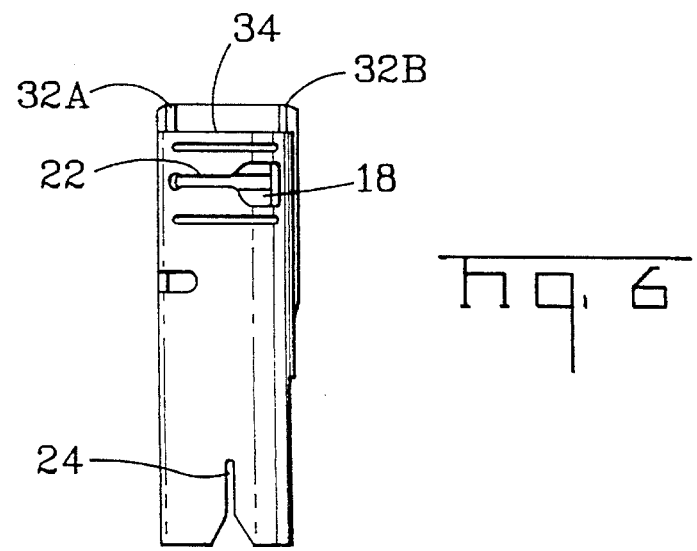
FIG. 6 is a back view of the connector body.

Although the cap 50 and terminal 10A are rotatable with respect to one another, the angle through which the cap 50 may rotate is fixed, because as best shown in FIGS. 5 and 6, the terminal has rotational stops 32A and 32B, and the cap in turn, as shown in FIG. 11, has a rotational stop lug 64, having surfaces 64A and 64B. When the cap 50 is received over terminal 10A such that the wire opening hole 54 in the cap 50 aligns with wire opening holes 12 and 18, surface 64B of lug 64 is against surface 32B of terminal 10A, and when the cap is rotated, the rotation is limited by surface 64A of lug 64 against surface 32A of terminal 10A. Thus, the angle of rotation is defined by the angle of surface 34 as defined by surfaces 32A and 32B, less the included angle of lug 64, as defined by surfaces 64A and 64B, and is the angle required to terminate either the small wire or the large wire in the upper insulation displacement portion 8.

If a small wire is to be terminated, the small wire is placed in hole 54 and extends through sections 54A, 54B and 54C, also passing through large wire receiving opening 12, and then through small wire receiving opening 18 and into channel 78. When the cap is rotated relative to the terminal, the wire is carried in the channel, and the side wall of channel 78 forces the conductor into the small wire terminating slot 20, and the small wire makes electrical and mechanical contact with sheared surfaces 21A and 21B at three points, because the width of at least inner slot 20A is slightly smaller than the diameter of the small wire conductor. The small wire is also rotated into slot 14, and the insulation of the small wire is gripped by slot 14, which acts as a strain relief. Conversely, when a large wire is placed in hole 54, the large wire passes through the large wire receiving opening 12 but then is precluded from entering section 54B, and remains in section 54C, bearing against frusto-conical surface 76. When the cap is rotated relative to the terminal, the large wire is carried within hole 54 and the large wire is forced into the large wire receiving slot 14 and the large wire makes electrical and mechanical contact with sheared surfaces 15A and 15B at three points, because the width of at least inner slot 14A is slightly smaller than the diameter of the large wire conductor.

Figure 8A:
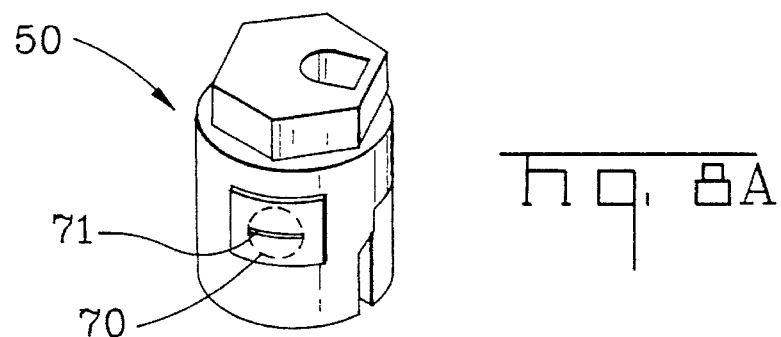
FIG. 8A is a perspective view of the terminating cap showing an embodiment including wiping means.
Figure 9:
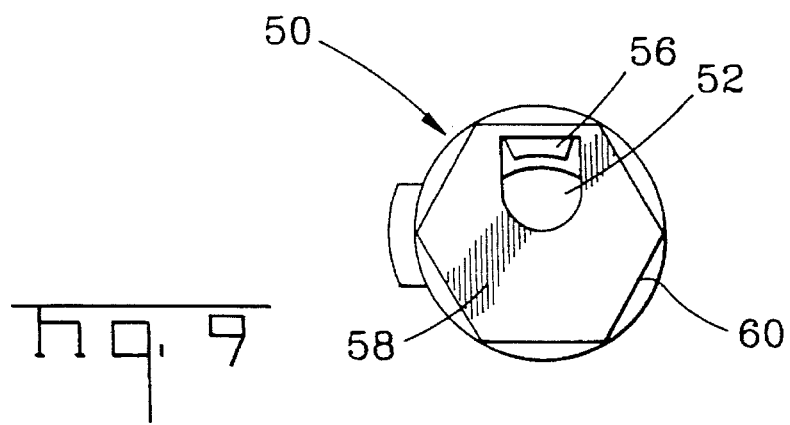
FIG. 9 is a top view of the terminating cap.
Figure 10:
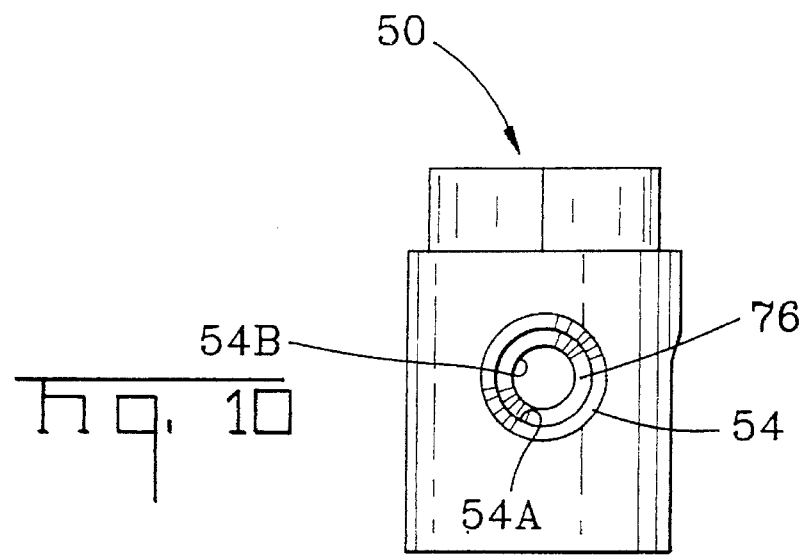
FIG. 10 is a side view of the terminating cap.

According to preferred embodiments of the present invention, one or more of the access openings 12, 18 and 54 are covered by a thin resilient film having a narrow slit or opening therein. As illustrated in FIG. 8A, for example, access opening 54 is covered by a thin resilient film 70 having a narrow slit 71 therein. The wiper means according to such embodiments preferably comprises thin polyurethane tape adhered to the terminal.

Another type of cap block for interconnecting a pair of wires is disclosed in U.S. Pat. No. 5,006,077, which is incorporated herein by reference and with which the present invention may be used. A tubular dielectric housing has a center post therein defining an annular cavity. A stationary tubular terminal is affixed within the cavity adjacent the center post; a rotatable tubular terminal is disposed within the cavity concentrically around the stationary terminal and in electrical engagement therewith at all times; and a lug-capped tubular actuator is also mounted to the housing and is adapted to be rotated between actuated and unactuated positions to rotate the rotatable terminal. A pair of wire-receiving apertures extend through apertures through the housing wall, through apertures of both terminals and the actuator, and at least into a center post aperture, all aligned in an unactuated state for a wire end to be inserted thereinto. Preferably the terminal block would have a thin resilient slit film over the wire-receiving apertures through the housing wall. Further, the probe opening through the actuator lug could be deepened to provide for sealant to move thereinto upon wire insertion. Upon rotation of the rotatable terminal by the actuator, slot walls of the terminal pierce the wire insulation and engage the wire's conductor. The stationary terminal includes a contact section extending outwardly from the housing including insulation displacement slots for a wire to be inserted thereinto and terminated, for a multi-conductor stub cable length to be secured to the enclosure containing a plurality of the terminal blocks, thus defining a cable harness. The two terminal members thus interconnect an appropriate conductor of the stub cable to a wire inserted into the terminal block. A second set of wire-receiving apertures can be utilized to receive a second inserted wire end to be interconnected with the first and with the stub cable connector.

Yet another type of terminal block is disclosed in U.S. patent application Ser. No. 07/708,405 filed May 31, 1991, which is incorporated herein by reference and which is assigned to the assignee hereof. Disclosed therein is a terminal block having a single-piece terminal with connecting sections for two wires to be spliced, which are of the insulation piercing or displacement type which eliminates the need for stripping the insulation from the signal wire conductors. A dielectric housing includes an integrally molded center post within a tubular terminal-receiving housing section, both coextending from a common base section and defining an annular cavity, the housing section providing wire-receiving openings through side walls and into the cavity aligned with an aperture through the center post, enabling insertion of wire ends during splicing. A barrel terminal and an associated lug-capped tubular actuator is then assembled to the housing, with the barrel terminal surrounding the center post within the cavity and having apertured insulation displacement contact sections which are initially aligned with the wire-receiving openings of the housing and center post, and the actuator also having profiled apertures therethrough extending partially around the circumference and also aligned with the wire-receiving openings of the housing, center post and terminal. The lug extends above the housing upon assembly to be accessible to tooling for rotation thereof to rotate the actuator and the terminal. Again the probe opening the actuator lug can be deep, and a film can cover the wire-receiving openings of the housing side wall. During splicing the wire ends of both wires are inserted into respective openings and through the apertured contact sections until stopped by abutment with corresponding stop surfaces of the housing which then holds the wire ends at two spaced locations, both outside and within the terminal wall; the actuator is then rotated thus rotating the terminal forcing the wire slot edges to pierce the wire insulation of both wires and electrically connect with the conductors therein.

B. Second Embodiment

Figure 12:
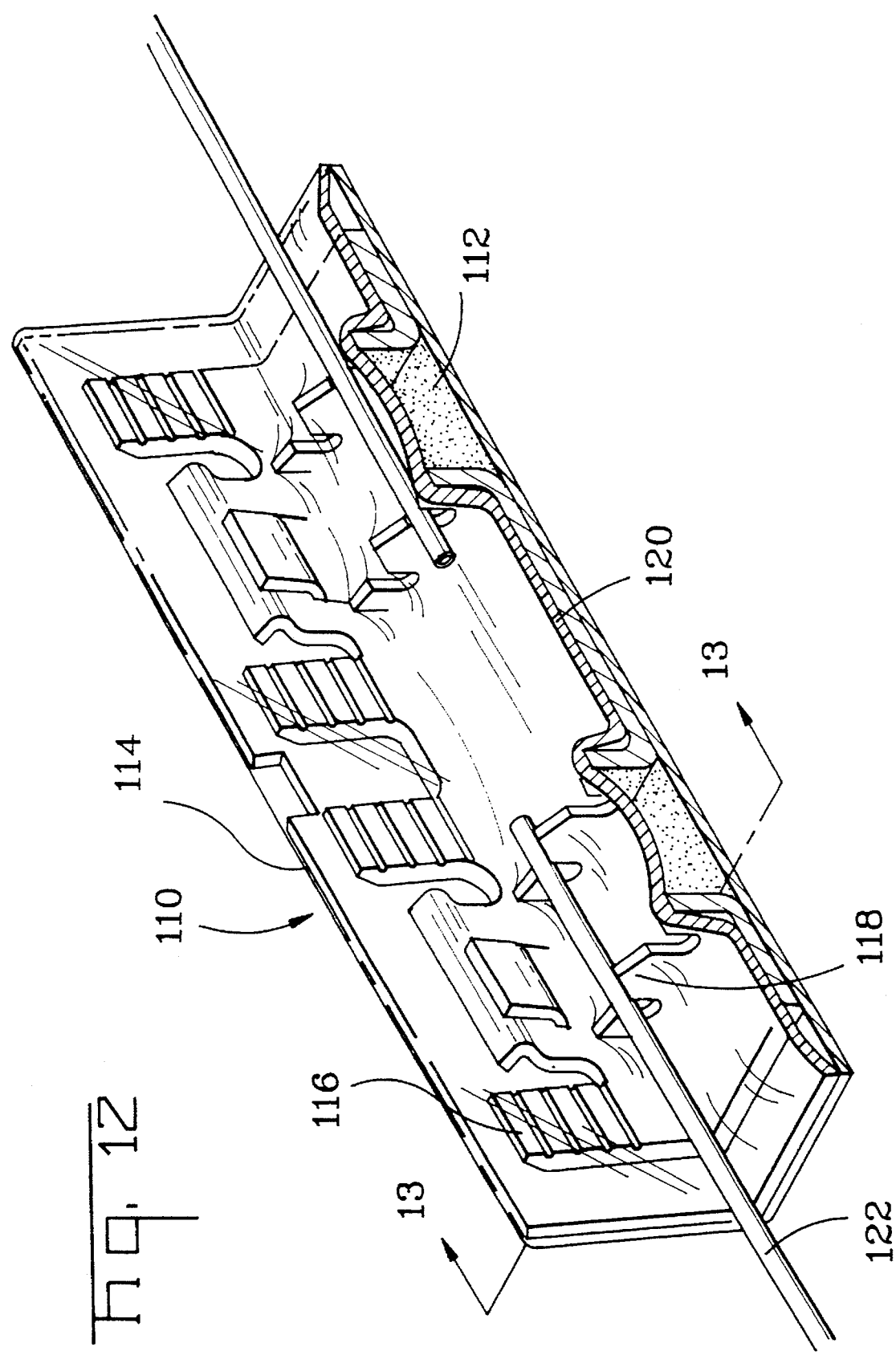
FIG. 12 is a longitudinal sectional perspective view of an uncrimped ferrule type pre-insulated crimpable insulation displacement connector having sealant therein.
Figure 13:
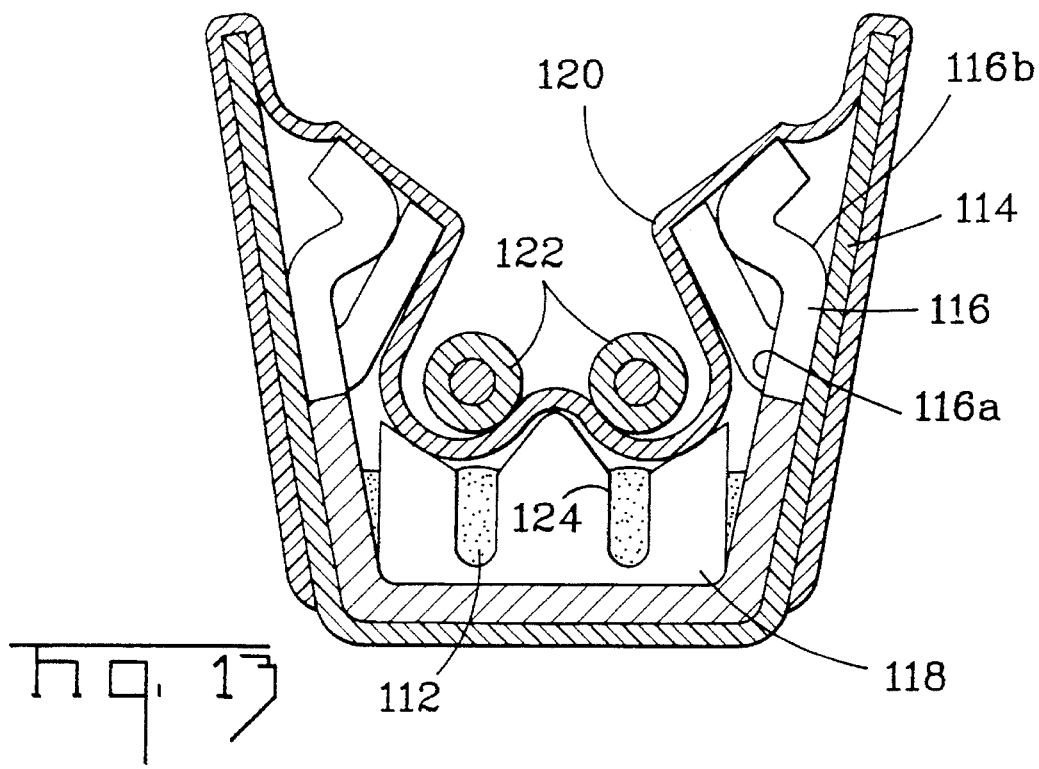
FIG. 13 is a cross-sectional view taken along line 13—13 of FIG. 12.
Figure 14:
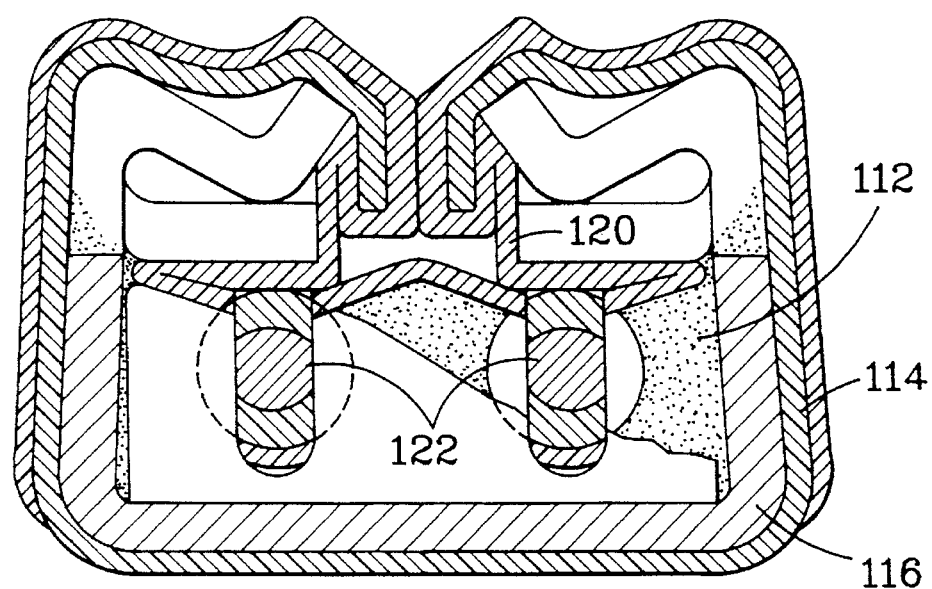
FIG. 14 is a view similar to FIG. 13 but showing the positions of the sealant and the parts after crimping.

While the first embodiment described above provides especially preferred reusable electrical connectors, it is contemplated that electrical connectors according to other configurations are adaptable for use with the present sealant compositions. For example, a second embodiment provides a single use electrical connector, as illustrated in FIGS. 12–14. Connectors of this type are also disclosed in U.S. Pat. No. 3,410,950—Freudenberg, in U.S. Pat. No. 4,714,801—Koblitz et al., and in U.S. Pat. No. 5,004,869—Koblitz et al., each of which is incorporated herein by reference and assigned to the assignee of the present invention. These connectors are available from AMP Incorporated under the trade designation PICABOND®.

With particular reference now to FIGS. 12–14, a connector comprising a connector 10 having transmission terminating means 16 is disclosed. The connector is comprised of an outer insulating film 14, an open U-type metal terminal 16 having a plurality of wire-receiving projections 18 extending from inner surface 16A of terminal 16. Sealing material 12, and preferably the sealing composition of the present invention, is dispensed into the connector body 10 and in this particular embodiment it is deposited on the terminal 16, particularly in the areas of projections 18. Connector 10 further has an inner insulating film layer 20 therein which extends over the sealant 12 and projections 18. Film layer 20 is sealed, preferably by means of heat, to the sides of the terminal 16 thus encasing the sealant material.

In using the connector 10, means for transmitting electrical current or signals, such as wires 22, are inserted from opposite ends of the connector 10 and disposed in the area of projections 18. As is shown in FIGS. 12 and 13, the wires 22 lie on top of the inner film layer 20. FIG. 14 shows a cross-section of the crimped connector 10. Crimping of connector 10 generally requires exertion of force on the side walls 16B of the terminal 16 sufficient to deform the terminal into a position similar to the one shown in FIG. 14, thereby forcing the wires 22 into receiving slots 24 of projections 18. Slots 24 are narrower than the diameter of the conductors within wires 22 for side edges of slots 24 to pierce the insulation surrounding the conductors to establish electrical connections therewith. For the purpose of convenience, the force required to produce such a deformation is referred to herein as the normal crimping force. As will be understood by those skilled in the art, the magnitude of this force will vary somewhat depending upon several factors, including connector design and size. During the crimping of the connector 10, wires 22 rupture the film layer as they are forced into receiving slots 24 of projection 18. As a result of the pressure exerted by the normal crimping force, sealant 12 of the present invention is deformed as it is forced through the breach in the film layer 20 and surrounds the intersections of the wires and the projection, thereby sealing the immediate contact areas between the wires and the connector.

II. THE METHODS

It is contemplated that, in view of the information contained herein, compositions according to the present invention may be readily prepared using known techniques. Nevertheless, it is preferred that the present compositions be prepared according to the methods described herein in order to obtain compositions well adapted for use as sealants.

The methods of the present invention generally comprise the step of providing a solution, dispersion and/or emulsion of the elastomeric thermoplastic polymer in the extender, and raising said solution, dispersion or emulsion to at least about the gelation initiation temperature of the polymer/extender mixture, and even more preferably to at least about the fusion temperature of the polymer/extender mixture. As is well known to those skilled in the art, the application of heat to polymer/extender mixtures of the type disclosed herein generally causes physical changes in the rheology of the mixture. Without intending to be bound by or limited to any particular theory, it is believed that upon the application of heat to the solutions, dispersions or emulsions of the present invention, the extender portion thereof begins to become solvated in the polymer while fractions of the polymer dissolve in the extender. As additional heat is applied to the composition, continued solvation of the extender and the polymer results in a substantial increase in viscosity and a corresponding loss of composition fluidity. This increase in viscosity and loss of fluidity is generally associated with the onset of the "gelation" of the composition. It will be appreciated by those skilled in the art that as the temperature is raised from about room temperature to about the onset of gelation, the fluid polymer/extender compositions of the present invention may first exhibit an initial decrease in viscosity, followed by the gradual increase in viscosity described above. Upon application of further heat and a further increase in temperature, a peak in viscosity is reached, and thereafter the present compositions exhibit increasing fluency as the gel becomes liquid-like. For the purposes of convenience, the term "gelation temperature range" is used herein to refer to the range of temperature spanning from about the initial increase in composition viscosity to about the end of the peak in viscosity. Techniques are well known and available to those skilled in the art for determining the onset of gelation of any particular polymer/extender composition. For example, the onset of gelation may be measured using a gelation plate which is heated only at one end, thereby developing a temperature gradient from one end of the plate to the other. When a polymer composite/extender composition is cast onto the plate, the temperature of the plate at the point the composition begins to lose its fluidity is referred to herein as the composition's initial gelation temperature. The temperature at which the composition begins to regain fluidity is referred to herein as the gelation end point. It will be appreciated that these terms are used for the purposes of convenience, but not by way of limitation.

The gelation temperature range of any particular composition is a function of many variables, including the type and relative amounts of extender and polymer material present. It is generally contemplated, however, that gelation of the present compositions will take place at temperatures of from about 125° C. to about 200° C. with sufficient time. As additional heat is applied to the composition, incorporation of the extender into the polymer domains occurs and the composition becomes liquid-like. In particular, heating of the present compositions for a time sufficiently beyond the gelation end point causes the extender molecules to become fully incorporated into the matrix of the polymer molecules, and the extender becomes substantially integrated into the polymer network. In such a state, the composition is said to be a fused liquid-like composition. According to certain embodiments, the completion of gelation is determined by monitoring the torque required by the mixer over time and noting the approximate peak torque thereof and its elapsed time.

Certain embodiments of the present methods preferably also comprise the important step of incorporating a crosslinkable polymer into the thermoplastic elastomer/extender mixture. It is especially preferred that such an incorporating step comprise incorporating precursors for said crosslinkable polymer into a fluid composition comprising said thermoplastic elastomer and then crosslinking said polymer precursors in the presence of said thermoplastic elastomer. It is contemplated that the step of incorporating the crosslinked polymer precursors into the composition can occur, before, during and/or after the heating step described above. It is preferred, however, that the polymer precursors be added to the mixture after the initiation of gelation of the organic polymer/extender mixture, more preferably after the gelation end point is reached, and even more preferably after liquification of the organic polymer/extender composition.

It is contemplated that the step of crosslinking the precursors in the presence of the thermoplastic elastomer may utilize any one of several well-known techniques, and all such techniques are within the scope of the present invention. For embodiments in which the crosslinkable polymer comprises crosslinkable silicon based polymer, it is preferred that the polymer precursor comprise first and second functionalized silicon-based polymers wherein said first polymer is a hydrosilicon functionalized silicon-based polymer and said second polymer is a vinyl functionalized silicon-based polymer. A suitable crosslinkable silicon-based polymer is SYLGARD 527, obtainable from Dow Corning Corporation, Midland, Mich. In such embodiments, the crosslinking step comprises introducing said first and second polymer precursors into the thermoplastic elastomer/extender mixture during the heating thereof. It is also preferred that the crosslinking step comprise introducing a crosslinking catalyst, and preferably a platinum crosslinking catalyst, into the mixture before, during or after the introduction of said polymer precursors. It is believed that this chemical crosslinking further enhances the thermal resistance of the sealant composition.

The examples which follow are illustrative but not limiting of the present invention.

III. EXAMPLES

EXAMPLE 1

About 92 parts by weight (pbw) of an extender, about 1 pbw of a first thermoplastic elastomeric polymer, about 4 pbw of a second thermoplastic elastomeric polymer, and about 5 pbw of fumed silica were introduced at room temperature into a two liter heavy walled glass mixing beaker. The beaker was provided with a heating source and a three-bladed mixing propeller. The extender was Kaydol oil, sold by Witco, having a kinematic viscosity of about 65–70 centistokes at 40° C., a specific gravity of about 0.87–0.89 at 25° C. and a pour point as measured by ASTM D97 of about −18° C. The first thermoplastic elastomer was a poly(styrene-ethylene-butylene-styrene) triblock copolymer, available from the Shell Development Corporation under the trademark KRATON G 1651, having a styrene end block to ethylene and butylene center block ratio of about 33:67. As described in the Shell Company Technical Bulletin SC1102-89, KRATON G 1651 has a melt viscosity of 42,700 when present at a concentration of 5% in Kaydol oil at 300° F. The second thermoplastic elastomer was a low strength diblock copolymer, poly(styrene-ethylene-propylene), sold by Shell Development Corporation under the trademark KRATON G 1701. As described in the Shell Company Technical Bulletin SC1102-89, KRATON G 1701 has a melt viscosity of 209 when present at a concentration of 5% in Kaydol oil at 300° F. The fumed silica was a fully hydrophobized 200 sq m/g amorphous silica sold under the trademark AEROSIL R-974 by the Degussa Corporation.

With constant stirring by the three-bladed propeller at about 750 rpm the temperature of the mixture was raised gradually from about room temperature to about 190° C. over a period of about 80 minutes to produce a relatively homogenous, glutinous composition. Stirring was continued for about an additional 80 minutes as the temperature of the mixture was lowered from about 190° C. to about 160° C. With the mixture temperature at about 160° C., about 25 pbw of the SYLGARD 527 precursors described above was introduced gradually during a two minute period into the glass mixing beaker. The mixture was maintained at about 160° C. and stirring was continued for about an additional 30 minutes.

After cooling 24 hours at room temperature the contents of the beaker were observed to be a translucent homogenous, well dispersed thermoplastic gel sealant composition having a viscosity at 74° F. of about 266 units (0.1 mm) as measured by the ASTM D217 method for testing cone penetration of lubricating greases as described below.

ASTM D217 is a standard test procedure entitled "Standard Test Methods for Cone Penetration of Lubricating Grease," adopted by the American Society for Testing and Materials (ASTM) and used throughout the materials industry to determine viscosities of lubricating greases. This procedure was used to determine the cone penetration at 25° C. (77° F.) of a sample of the sealant that had received only minimum disturbance in transferring the sample to a grease worker cup or other suitable container. The apparatus used was a penetrometer, which is designated to measure in tenths of a millimeter the depth to which a standard cone penetrates the sample. The penetrometer has an adjustable table to properly position the cone on the surface of the sample prior to releasing the cone. The standard cone used was made of magnesium with a detachable, hardened steel tip having a total weight of 102.5±0.1 g in accordance with specifications of the test. A quantity of the sealant material and the test sample container are brought to a temperature of 25±0.5° C. in a water or air bath. A sample of the material is transferred to the container and packed to eliminate air pockets. The sample in the container is leveled and placed on the penetrometer table. The apparatus is adjusted so that the tip of the cone just touches the surface of the sample. The cone shaft is then released and allowed to drop for 5.0±0.1 seconds. The amount of penetration is read from an indicator on the apparatus. In accordance with the procedure the values given are the average of three penetration tests per sample.

The physical properties of the sealant composition of this Example were measured and are reported in Table 1.

TABLE 1

| Property Measured | Value |
| --- | --- |
| Appearance: | Translucent |
| Cone Penetration: | 266 |
| (ASTM D217) | |
| (units are 0.1 mm) | |
| Bleed 24 hrs. @ 80° C. | 0 |
| (Fed Spec 321.1) | |
| Bleed 24 hrs. @ 100° C. | 0 |
| (Fed Spec 321.1) | |
| Fineness of grind | 8 |
| (ASTM D1210) (NS) | |
| Slump test 80° F., 24 hrs. (inch) | 0.05 |
| 100° F., 24 hrs. (inch) | 0.3 |

EXAMPLE 2

About 90 pbw of extender consisting of INDOPOL-H100 (polyisobutene) is introduced at about room temperature into a mixing vessel provided with a heating source. INDOPOL H-100 is manufactured by Amoco and has a kinematic viscosity of about 196–233 centistokes at 100° F., a specific gravity of about 0.88–0.90 at 60° F. and a pour point as measured by ASTM D97 of about 20° F. The extender is heated to about 75° F. and mixed for about 15 minutes. About 0.75 pbw of KRATON G 1651 (S-EB-S triblock) and about 7.5 pbw of KRATON G 1701 (S-EP diblock) are then added to the mixing vessel and mixing was continued for about 15 minutes at a temperature of about 75° F. to produce a dispersion. About 0.5 pbw of antioxidant and thermal stabilizer, tetrakis[methylene(3,5-di-tert-butyl-4-hydroxyhydrocinnamate)]methane, sold by the Ciba-Geigy Corporation under the trademark IRGANOX 1010 is then added to the mixture.

The mixture is maintained at about 375° F. and stirring is continued for about an additional 120 minutes, at which point about 0.05 pbw of corrosion inhibitor, about 0.015 pbw of fungicide and about 0.05 pbw of a surfactant are added to the mixing vessel. The corrosion inhibitor is benzotriazole supplied under the trademark COBRATEC 99 by PMC, Incorporated, the fungicide is 2-(4-thiazdyl)benzimidazole supplied under the trademark METASOL™ TK-100 by Calgon Corporation and the surfactant is a proprietary fluorinated esters non-ionic surfactant supplied under the trademark FLUORAD FC430 by 3M Corporation. It is required to heat the mixture at temperature of about 420° F., with continual stirring for about an additional 120 minutes. The contents of the vessel are then cooled to about room temperature.

A clear, yellow gel sealant having the properties listed in Table 2 below is produced.

TABLE 2

| Property Measured | Value |
| --- | --- |
| Appearance: | Clear |
| Cone Penetration: | 300 |
| (ASTM D217) | |
| (units are 0.1 mm) | |
| Softening Point: (°C.) | 90 |
| Melt Flow: 3 sec., | 0.8 |
| 163° C. 30 psi (g/s) | |
| Pour point: (°C.) | 200 |
| Slump test: 80° C., | 0.4 |
| 24 hrs. (inches) | |

TABLE 2-continued

| Property Measured | Value |
| --- | --- |
| Brookfield Viscosity: | 35 |
| 204° C. (poise) | |
| Oil retention: | |
| 80° C. (percent) | 100 |

As can be seen from the results of this example, a sealant having several desirable properties is produced. However, the viscosity and melt flow characteristics are slightly below those desired for certain applications.

EXAMPLE 3

Example 2 is repeated, except that the extender consists of 90 pbw of Kaydol (mineral oil), that is, the INDOPOL H-100 component of Example 2 is replaced on a one-to-one basis by Kaydol. Kaydol oil is available from the Sonneborn Company, a division of Witco Corp. and has a kinematic viscosity of about 65–70 at 40° F., a specific gravity of about 0.87–0.89 at 25° C. and a pour point of about −18° F.

In addition, the final mixing step of this example only requires a mixture temperature of about 375° as opposed to the additional mixing at a mixture temperature of about 420° F. required in Example 2.

A clear, water-white gel sealant having the properties listed in Table 3 below is produced.

TABLE 3

| Property Measured | Value |
| --- | --- |
| Appearance: | Clear |
| Cone Penetration: | 315 |
| (ASTM D217) | |
| (units are 0.1 mm) | |
| Softening Point: (°C.) | 95 |
| Melt Flow: 3 sec., | 1.8 |
| 163° C. 30 psi (g/s) | |
| Pour point: (°C.) | 155 |
| Slump: 80° C. | 0.8 |
| 24 hrs. (inches) | |
| Brookfield Viscosity: | 1 |
| 204° C. (poise) | |
| Oil retention: | 100 |
| 80° C. (percent) | |

As can be seen from the results of this example, a sealant which is highly flowable, especially relative to the sealant of Example 2 is produced. However, the sealant of this example exhibits an undesirably poor slump resistance.

EXAMPLE 4

Example 3 is repeated, except that the extender consists of about 45 pbw of Kaydol and about 45 pbw of INDOPOL.

A clear, nearly water-white, homogeneous high-temperature functional gel sealant according to the present invention having the properties listed in Table 4 below is produced.

TABLE 4

| Property Measured | Value |
| --- | --- |
| Appearance: | Clear |
| Cone Penetration: | 315 |
| (ASTM D217) | |
| (units are 0.1 mm) | |
| Softening Point: (°C.) | 105 |
| Melt Flow: 3 sec., | 1.0 |

TABLE 4-continued

| Property Measured | Value |
|---|---|
| 163° C. 30 p.s.i. (g/s) | |
| Pour point: (°C.) | 200 |
| Slump: 80° C., 24 hrs. (inches) | 0.2 |
| Brookfield Viscosity: 204° C. (poise) | 22 |
| Oil retention: 80° C. (percent) | 100 |

As can be seen from the results of this example and a comparison to Examples 2 and 3, a sealant with unexpected and synergistic properties is produced. In particular, the sealant of this example not only exhibits slump resistance superior to the sealants of either of the previous examples, it even more surprisingly has melt flow and softening point characteristics which are also superior to the sealants of the prior examples.

The sealant of this example is tested for operability in a connector of the type described in the first connector embodiment hereof and sold by AMP Incorporated under the trade name, "Quiet Front". The electrical/thermal/environmental insulating capacity of the sealant of this example is tested by injecting the sealant into 30 samples of the connector. Ten samples each of the sealed connectors are tested according to the Bellcore Technical Reference TR-NWT-00975 (hereinafter termed "the Bellcore Reference") pursuant to sections 3.41, 3.42 and 3.43. All samples satisfy the requirements of the specified test conditions.

The sealant of this example also Satisfies the insulation resistance requirements specified in sections 3.1 of the Bellcore Reference. Ten connectors sealed by the sealant of this example were also subject to the test procedures specified in section 3.4.4 of the Bellcore Reference directed to measurement of stress relaxation and strain release. All of the samples met the requirements of this section. The connectors also passed the vibration, flex and compatibility standards set forth in the Bellcore Reference.

EXAMPLE 5

Example 4 is repeated except that about 3.0 pbw of a temperature stabilizing agent based on fully hydrophobized surface treated amorphous silica available from Degussa Corporation under the designation "Aerosil R-974" is added to the mixture at the additional 120 minute point.

A clear, homogenous, high-temperature functional gel sealant having the properties listed in Table 5 below is produced.

TABLE 5

| Property Measured | Value |
|---|---|
| Appearance: | Clear |
| Cone Penetration: (ASTM D217) (units are 0.1 mm) | 292 |
| Softening Point: (°C.) | 95 |
| Melt Flow: 3 sec., 163° C. 30 p.s.i. (grams) | 0.7 |
| Pour point: (°C.) | 185 |
| Slump: 80° C., 24 hrs. (inches) | 0.05 |
| Brookfield viscosity: 204° C. (poise) | 42 |
| Oil retention: 80° C. (percent) | 100 |

EXAMPLE 6

The composition of Example 4 was tested for its ability to protect a variety of different electrical connectors from water intrusion. The test protocol was based on the water immersion test specified in the Bellcore Reference which is incorporated herein by reference.

A first connector of the type described hereinabove and sold by AMP Incorporated under the trade name, Quiet Front was is tested. A second connector of the type described hereinabove and sold by AMP Incorporated under the trade name PICABOND® was also tested. A third connector sold by AMP Incorporated under the trade name, Tel-Splice, and described in AMP Instruction Sheet IS6502 was also tested. A fourth connector available under the trade designation, Automotive Diagnostic Connector, AMP Incorporated Part Number 776002 was also tested.

To perform the test an electrical connector containing the sealant composition of Example 4 was prepared. The connectors containing the sealant composition were immersed to a depth of 6 inches in a aqueous 5% NaCl salt solution. The connectors were then energized with a 48 volt dc potential applied between common sample leads and a copper electrode immersed in the basin. To confine the short circuit current to approximately 20 milliamperes, limiting resistors were placed in series with each sample. The insulation resistance between individual connectors and the water were measured at 1 hour, at 7 days and finally at 14 days using a 250 volt DC potential. A minimum insulation resistance (IR) criterion of $1 \times 10^8$ ohms was used as a fail point for all conductors. All test procedures were performed at ambient laboratory conditions. The immersion test results for each of the different types of connectors is presented below.

TABLE 6

INSULATION RESISTANCE RESULTS FOR QUIET FRONT CONNECTORS CONTAINING THE SEALANT COMPOSITIONS OF EXAMPLE 4

| Condition | Initial | Aft. 1 Hr. | Aft. 7 days | Aft. 14 days |
|---|---|---|---|---|
| # Samples | 12 | 12 | 12 | 12 |
| Min. IR $\Omega$ | $2 \times 10^{10}$ | $2 \times 10^{10}$ | $4 \times 10^{10}$ | $4 \times 10^{10}$ |
| Max. IR $\Omega$ | $3 \times 10^{10}$ | $2 \times 10^{10}$ | $4 \times 10^{10}$ | $2 \times 10^{11}$ |
| Mean IR $\Omega$ | $2.2 \times 10^{10}$ | $2.0 \times 10^{10}$ | $2.0 \times 10^{10}$ | $2.2 \times 10^{10}$ |
| # < $1 \times 10^8$ $\Omega$ | 0 | 0 | 0 | 0 |

Results show that no leakage occured on any silo during the two weeks of immersion testing. All samples maintained an insulation resistance of greater than $1 \times 10^8$ ohms.

TABLE 7

INSULATION RESISTANCE RESULTS FOR TEL-SPLICE CONNECTORS CONTAINING THE SEALANT COMPOSITION OF EXAMPLE 4

| Condition | Initial | Aft. 1 Hr. | Aft. 7 days | Aft. 14 days |
|---|---|---|---|---|
| # Samples | 10 | 10 | 10 | 10 |
| Min. IR $\Omega$ | $1 \times 10^{10}$ | $2 \times 10^{10}$ | $1 \times 10^{10}$ | $3 \times 10^{10}$ |
| Max. IR $\Omega$ | $2 \times 10^{10}$ | $3 \times 10^{10}$ | $2 \times 10$ | $1 \times 10^{11}$ |
| Mean IR $\Omega$ | $1.8 \times 10^{10}$ | $2.3 \times 10^{10}$ | $1.9 \times 10^{10}$ | $6.0 \times 10^{10}$ |
| # < $1 \times 10^8$ $\Omega$ | 0 | 0 | 0 | 0 |

The Tel-Splice samples also maintained an IR of greater than $1 \times 10^8$ ohms throughout the immersion test.

TABLE 8

INSULATION RESISTANCE RESULTS FOR DIAGNOSTIC CONNECTORS CONTAINING THE SEALANT COMPOSITION OF EXAMPLE 4

| Condition | Initial | Aft. 1 Hr. | Aft. 7 days | Aft. 14 days |
|---|---|---|---|---|
| # Samples | 10 | 10 | 9 | 8 |
| Min. IR $\Omega$ | $1 \times 10^9$ | $4 \times 10^9$ | $4 \times 10^{10}$ | $1 \times 10^{10}$ |
| Max. IR $\Omega$ | $6 \times 10^9$ | $4 \times 10^{10}$ | $1 \times 10^{11}$ | $2 \times 10^{11}$ |
| Mean IR $\Omega$ | $3.1 \times 10^9$ | $7.9 \times 10^9$ | $8.8 \times 10^{10}$ | $1.6 \times 10^{11}$ |
| # < $1 \times 10^8$ $\Omega$ | 0 | 0 | 1 | 2 |

All PICABOND connectors failed the immersion test initially. It is expected that this result occurred because of the particular elastomeric properties of the sealant of Example 4. Nevertheless, it is contemplated that appropriate modification of the Example 4 sealant within the scope of the present invention is capable of producing satisfactory immersion test results.

EXAMPLE 7

The composition of Example 4 is tested for its ability to reliably protect Quiet Front type connectors of the type described in the first embodiment hereof and sold by AMP Incorporated under the trade name, Quiet Front, from water intrusion. The test protocol is based on the water immersion test described in Example 6.

Three hundred Quiet Front connectors containing the sealant composition of Example 4 were prepared. The connectors containing the sealant composition were immersed to a depth of 6 inches in an aqueous 5% NaCl salt solution and tested as in Example 4. An unusually large number of circuits passed the test even after 14 days of immersion, as reported in Table 9 below.

TABLE 9

PERCENTAGE OF CIRCUITS PASSING THE IMMERSION TEST

| Time | Initial | Aft. 7 Days | Aft. 14 days |
|---|---|---|---|
| # samples passing | 293 | 280 | 259 |
| % samples passing | 97.6 | 93.3 | 86.3 |

EXAMPLE 8

The composition of Example 4 is tested according to ASTM D4048 to predict its ability to protect electrical connections from environmental corrosion. ASTM D4048 measures the amount of copper strip corrosion resulting from exposure to a sealant. Utilizing the classification parameters described in ASTM D4048, the composition of Example 4 is classified as 1B. This classification indicates that the composition of Example 4 does not result in corrosion and causes only slight tarnishing of a copper strip and is therefore very well suited for electrical connection applications.

EXAMPLE 9

About 90 pbw of extender consisting of about 45 pbw of a Kaydol oil and about 45 pbw of INDOPOL is introduced at about room temperature into a mixing vessel provided with a heating source. The extender is heated to about 75° F. and mixed for about 15 minutes. About 7.5 pbw of KRATON G 1701 (S-EP diblock) is then added to the mixing vessel and mixing is continued for about 15 minutes at a temperature of about 75° F. to produce a dispersion. About 0.5 pbw of antioxidant/thermal stabilizer sold by the Ciba-Geigy Corporation under the trademark IRGANOX 1010 is then added to the mixture.

The mixture is maintained at about 375° F. and stirring is continued for about an additional 120 minutes, at which point about 0.05 pbw of corrosion inhibitor, about 0.015 pbw of fungicide and about 0.05 pbw of a surfactant are added to the mixing vessel. The corrosion inhibitor is benzotriazole supplied under the trademark COBRATEC 99 by PMC, Incorporated, the fungicide is 2-(4-thiazdyl)benzimidazole supplied under the trademark METASOL TK-100 by Calgon Corporation and the surfactant is a proprietary fluorinated esters nonionic surfactant supplied under the trademark FLUORAD FC430 by 3M Corporation. It is required to maintain the mixture at temperature of about 375° F., with continual stirring for about an additional 120 minutes. The contents of the vessel are then cooled to about room temperature.

A clear, yellow gel sealant having the properties listed in Table 10 below is produced.

TABLE 10

| Property Measured | Value |
|---|---|
| Appearance: | Clear |
| Cone Penetration: (ASTM D217) (units are 0.1 mm) | 365 |
| Softening Point: (°C.) | pourable at RT |
| Melt Flow: 163° C. 30 psi (g/s) | >3.3 |
| Slump: 80° C., 24 hrs. (inches) | >4.5 |
| Oil retention: 80° C. (percent) | 100 |

As can be seen from the results of this example, a generally unacceptable sealant composition is produced when only a primary polymer (S-EP diblock) is present in the composition. In particular, the slump resistance, melt flow and softening point characteristics indicate that such a sealant will not remain in the connector and/or will not adequately seal electrical connections under the preferred operating temperature range.

EXAMPLE 10

Example 9 is repeated, except that the primary polymer consisted of 7.5 pbw of KRATON G 1701 and (S-EP diblock) and about 0.75 pbw of KRATON G 1652 (S-EB-S triblock).

A clear, yellow gel sealant having the properties listed in Table 11 below is produced.

TABLE 11

| Property Measured | Value |
|---|---|
| Appearance: | Clear |
| Cone Penetration: (ASTM D217) (units are 0.1 mm) | 354 |
| Softening Point: (°C.) | pourable at RT |
| Melt Flow: 163° C., 30 psi (g/s) | >3.3 |
| Slump: 80° C., 24 hrs. (inches) | >4.5 |
| Oil retention: 80° C. (percent) | 0 |

As can be seen from the results of this example, a generally unacceptable sealant composition is produced even when a primary polymer containing both diblock and triblock copolymer components is present in the composition. In particular, the slump resistance, spew resistance, melt flow and softening point characteristics indicate that such a sealant will not remain in the connector and/or will not adequately seal electrical connections under the preferred temperature range indicated above.

EXAMPLE 11

Example 9 is repeated, except that in addition to the primary polymer (S-EP diblock), about 0.75 pbw of the secondary polymer KRATON G 1651 (S-EB-S triblock) is added to the composition.

A clear gel sealant having the properties listed in Table 12 below is produced.

TABLE 12

| Property Measured | Value |
|---|---|
| Appearance: | Clear |
| Cone Penetration: (ASTM D217) (units are 0.1 mm) | 305 |
| Softening Point: (°C.) | 108 |
| Melt Flow: 163° C., 30 psi (g/s) | 1.1 |
| Slump: 80° C., 24 hrs. (inches) | 0.10 |
| Oil retention: 80° C. (percent) | 100 |

As can be seen from the results of this example and a comparison to Examples 9 and 10, a sealant with unexpected and dramatically improved properties is produced. In particular, the sealant of this example exhibits a slump resistance which is about 150 times superior to either of the previous examples. Furthermore, the melt flow characteristics are about 3 times superior to the sealants of the prior examples.

EXAMPLE 12

The composition of Example 4 is used in a method of manufacturing sealed electrical connectors of the type sold by AMP Incorporated under the trade names, Tel-Splice and Quiet Front. These connectors have previously been sold containing grease-type sealants or not containing sealants.

The Quiet Front terminal blocks containing six silos per block are filled and sealed by intermittent "shots" of the composition of Example 4. The filling apparates is the PAM-Model 500-E hot melt extrusion gun with AMP nozzle hereinbefore described. The gun was loaded with about 50 g. of sealant composition.

Each silo is filled by triggering bursts of sealant for about one-fourth to one-half second until the sealant extrudes from the lug to silo flanges using an air pressure of 30 psig. at 325° F. The lug is in the closed (terminated) position while filling. The filling port is the test probe port with the silos vertical and the test probe port opening upward. The lower and upper wire entry ports are closed by rubber pads. The terminal block is allowed to cool to room temperature overnight, and the gain in weight of the blocks is measured. About 1.4 g of sealant per silo is found. This agrees reasonably with the predetermined 1.4 cc. volume of the silos.

The insulation resistance test described in Example 6 is performed on the filled blocks with no leakage occurring on any silo on initial testing.

The same apparatus and filling conditions are used in filling 10 Tel-Splice connectors. The top members of the housings are removed while the bottom members are filled by short bursts until the back sides of the termination members are covered. The top members are then replaced, expressing forward the sealant composition to slackly fill the case. Filling is completed by injecting through a wire entry hole until the case is filled visually bubble-free.

The splices are weighed to find the average weight gain of sealant composition per splice. This is found to be about 0.12 g per splice, which agrees reasonably with the predetermined 0.12 cc. volume of the splice.

The insulation resistance test of Example 6 is performed on the filled splices with no leakage occurring on any splice on initial testing.

We claim:

1. A moisture and temperature resistant electrical connector for sealingly connecting transmission means comprising:
    (a) a connector body comprising a substantially closed container having access means for allowing entry of said transmission means into said connector body and a terminal means for accepting and electrically connecting with said transmission means; and
    (b) a sealant composition in said container and disposed along or adjacent to said terminal means, said sealant composition comprising an elastomeric thermoplastic polymer and an organic extender for said polymer, said thermoplastic polymer comprising a first polymer and a second polymer, wherein said first polymer comprises di-block copolymer, said di-block copolymer comprises a block of non-elastomeric polymer connected to a block of elastomeric polymer, said non-elastomeric polymer block being selected from the group consisting of poly(alkenyl arenes), polyurethanes and mixtures thereof, and said elastomeric polymer block being selected from the group consisting of non-aromatic polyolefins, polyesters, polyethers and mixtures thereof, the melt viscosity of said second polymer being at least about 50 times greater than the melt viscosity of said first polymer, and the weight ratio of said second polymer to said first polymer being about 1:10, said organic extender comprising a major proportion by weight of said composition, wherein said composition has slump resistance of about 0.8 in. or less at about 80° C., and an elastic memory of at least about 200% at temperatures of from about −40° C. to about +80° C.

2. The connector of claim 1 wherein the weight ratio of said extender to said polymer is in the range of about 99.5:0.5 to 85:15.

3. The connector of claim 1 wherein said organic extender comprises:
    (a) a secondary extender selected from the group consisting of naphthenic oils, white oils, terpenoid hydrocarbons and combinations of these; and
    (b) a primary extender selected from the group consisting of polybutadiene, polybutene, polybutylene, hydrocarbon resins, atactic polypropylene, branched polyethylene and low molecular weight styrenic polymers.

4. The connector of claim 3 wherein said primary extender comprises a major proportion of polybutadiene oil and said secondary extender comprises a major proportion of mineral oil, and the primary extender:secondary extender weight ratio is from about 60:40 to 40:60.

5. The connector of claim 1 wherein said second polymer comprises tri-block copolymer.

6. The connector of claim 1 wherein said elastomeric polymer block comprises a $C_1$–$C_6$ non-aromatic polyolefin and said non-elastomeric polymer block comprises polystyrene.

7. The connector of claim 5 wherein said tri-block copolymer comprises a block of non-elastomeric polymer connected to a block of elastomeric polymer, said block of elastomeric polymer being connected to another block of non-elastomeric polymer, said non-elastomeric polymer block being selected from the group consisting of poly(alkenyl arenes), polyurethanes and combinations of these, and said elastomeric polymer block being selected from the group consisting of non-aromatic polyolefins, polyesters, polyethers and combinations of these.

8. The connector of claim 7 wherein said non-elastomeric block comprises a polystyrene and said elastomeric block comprises a $C_1$–$C_6$ non-aromatic polyolefin.

9. A moisture and temperature resistant electrical connector for sealingly connecting transmission means comprising:
    (a) a connector body comprising a container having access means for allowing entry of said transmission means into said connector body and a terminal means for accepting and electrically connecting with said transmission means; and
    (b) a sealant composition disposed in said container, said sealant composition comprising an elastomeric thermoplastic polymer composite and an organic extender for said polymer composite, said organic extender comprising a major proportion by weight of said composition and said polymer comprising a minor proportion by weight of said composition, wherein said elastomeric thermoplastic polymer comprises a composite of a first elastomeric thermoplastic polymer and a second elastomeric thermoplastic polymer, wherein said first polymer comprises di-block copolymer, said di-block copolymer comprises a block of non-elastomeric polymer connected to a block of elastomeric polymer, said non-elastomeric polymer block being selected from the group consisting of poly(alkenyl arenes), polyurethanes and mixtures thereof, the said elastomeric polymer block being selected from the group consisting of non-aromatic polyolefins, polyesters, polyethers and mixtures thereof, the melt viscosity of said second polymer being at least about 50 times greater than the melt viscosity of said first polymer, and the weight ratio of said second polymer to said first polymer being about 1:10.

10. The connector of claim 9 wherein said sealant composition has a flow of at least about 2 gram per min. at about 160° C., a slump resistance of less than about 0.5 in. at about 80° C., and an elastic memory of at least about 200% at temperatures of from about −40° C. to about +80° C.

11. The connector of claim 9 wherein the weight ratio of said extender to said polymer is in the range of about 99.5:0.5 to 85:15.

12. The connector of claim 9 wherein said organic extender comprises:

(a) a secondary extender selected from the group consisting of naphthenic oils, white oils, terpenoid hydrocarbons and combinations of these; and (b) a primary extender selected from the group consisting of polybutadiene, polybutene, polybutylene, hydrocarbon resins, atactic polypropylene, branched polyethylene and low molecular weight styrenic polymers.

13. The connector of claim 12 wherein said primary extender comprises a major proportion of polybutadiene oil and said secondary extender comprises a major proportion of mineral oil, and the primary extender:secondary extender weight ratio is from about 60:40 to 40:60.

14. The connector of claim 9 wherein said second polymer comprises tri-block copolymer.

15. The connector of claim 9 wherein said elastomeric polymer block comprises a $C_1$–$C_6$ non-aromatic polyolefin and said non-elastomeric polymer block comprises polystyrene.

16. The connector of claim 14 wherein said tri-block copolymer comprises a block of non-elastomeric polymer connected to a block of elastomeric polymer, said block of elastomeric polymer being connected to another block of non-elastomeric polymer, said non-elastomeric polymer block being selected from the group consisting of poly(alkenyl arenes), polyurethanes and combinations of these, and said elastomeric polymer block being selected from the group consisting of non-aromatic polyolefins, polyesters, polyethers and combinations of these.

17. The connector of claim 16 wherein said non-elastomeric block comprises a polystyrene and said elastomeric block comprises a $C_1$–$C_6$ non-aromatic polyolefin.

18. The connector of claim 5 wherein said first polymer consists essentially of di-block copolymer and said second polymer consists essentially of tri-block copolymer, the weight ratio of tri-block to di-block copolymer being about 1:10.

19. The connector of claim 14 wherein said first polymer consists essentially of di-block copolymer and said second polymer consists essentially of tri-block copolymer, the weight ratio of tri-block to di-block copolymer being about 1:10.

* * * * *